(12) United States Patent
Ashcroft

(10) Patent No.: US 10,330,226 B1
(45) Date of Patent: Jun. 25, 2019

(54) COLOR CHANGING HOSE

(71) Applicant: Thomas William David Ashcroft, Granby (CA)

(72) Inventor: Thomas William David Ashcroft, Granby (CA)

( * ) Notice: Subject to any disclaimer, the term of this patent is extended or adjusted under 35 U.S.C. 154(b) by 0 days.

(21) Appl. No.: 15/683,655

(22) Filed: Aug. 22, 2017

Related U.S. Application Data

(63) Continuation-in-part of application No. 15/140,435, filed on Apr. 27, 2016, now Pat. No. 9,765,909.

(60) Provisional application No. 62/153,565, filed on Apr. 28, 2015.

(51) Int. Cl.
| | |
|---|---|
| *F16L 11/12* | (2006.01) |
| *F16L 11/20* | (2006.01) |
| *F16L 33/01* | (2006.01) |
| *G01D 13/02* | (2006.01) |
| *B32B 1/08* | (2006.01) |

(52) U.S. Cl.
CPC ............. *F16L 11/124* (2013.01); *F16L 11/20* (2013.01); *F16L 33/01* (2013.01); *B32B 1/08* (2013.01); *B32B 2307/51* (2013.01); *B32B 2597/00* (2013.01); *G01D 13/02* (2013.01)

(58) Field of Classification Search
CPC ................................ F16L 11/124; F16L 11/20
USPC ............. 138/118, 119, 104; 73/762; 116/335
See application file for complete search history.

(56) References Cited

U.S. PATENT DOCUMENTS

| | | | |
|---|---|---|---|
| 2,814,529 A | 11/1955 | Arnt | |
| 3,035,779 A | 5/1962 | Convis | |
| 3,547,160 A | 12/1970 | McLarty | |
| 4,119,123 A * | 10/1978 | Samuels | ................. F16L 11/16 138/104 |
| 4,629,641 A | 12/1986 | Paullia | |
| 4,669,508 A | 6/1987 | Neaves | |
| 4,846,510 A | 7/1989 | Mikol | |
| 4,921,147 A | 5/1990 | Poirier | |
| 5,311,753 A | 5/1994 | Kanao | |
| 5,690,146 A * | 11/1997 | Stammen | .............. F16L 11/045 116/208 |
| 6,024,132 A * | 2/2000 | Fujimoto | ................ F16L 11/15 138/118 |
| 6,041,825 A | 3/2000 | Smith et al. | |
| 6,523,539 B2 | 2/2003 | McDonald et al. | |
| 6,948,527 B2 | 9/2005 | Ragner et al. | |

(Continued)

OTHER PUBLICATIONS

International Search Report for International Application No. PCT/IB2016/000629, dated Sep. 8, 2016, 11 pages.

*Primary Examiner* — Patrick F Brinson
(74) *Attorney, Agent, or Firm* — Thomas G. Ference

(57) ABSTRACT

A hose having an observed color, the hose includes a tubular wall having an interior, an exterior and a thickness. The observed hose color changes between a first hose color in a first state and a second hose color in a second state. Differences between the first state and second state may be the result of different expansions of the hose, different pressure pressures within the hose, differences in amount of fluid within the hose and different tensions states for the hose. Observed color changes between the first state and second state may be a color change, a color shade change, alternating rings of at least two different colors or shades of color along the length of the hose, a color pattern change or even the generation of indicia on the hose.

25 Claims, 39 Drawing Sheets

(56) References Cited

U.S. PATENT DOCUMENTS

| | | | |
|---|---|---|---|
| 7,520,302 B2* | 4/2009 | Smith | F16L 11/1185 |
| | | | 138/118 |
| 7,549,448 B2 | 6/2009 | Ragner | |
| 7,617,762 B1 | 11/2009 | Ragner | |
| 7,735,523 B2 | 6/2010 | Smith et al. | |
| 8,291,941 B1 | 10/2012 | Berardi | |
| 8,291,942 B2* | 10/2012 | Berardi | F16L 11/12 |
| | | | 138/118 |
| 8,739,835 B2* | 6/2014 | Sigouin | F16L 39/005 |
| | | | 138/104 |
| 9,989,174 B2* | 6/2018 | Garrett | B29D 23/18 |
| 2003/0098084 A1 | 5/2003 | Ragner et al. | |
| 2009/0032131 A1 | 2/2009 | Boettner | |
| 2009/0314097 A1* | 12/2009 | Cairo | G01L 1/247 |
| | | | 73/762 |
| 2010/0089521 A1* | 4/2010 | Ng | F16L 11/081 |
| | | | 156/145 |
| 2010/0170589 A1 | 7/2010 | Boettner et al. | |
| 2012/0234425 A1 | 9/2012 | Berardi | |
| 2013/0087205 A1 | 4/2013 | Berardi | |
| 2013/0180615 A1 | 7/2013 | Ragner et al. | |
| 2014/0130930 A1 | 5/2014 | Ragner | |

\* cited by examiner

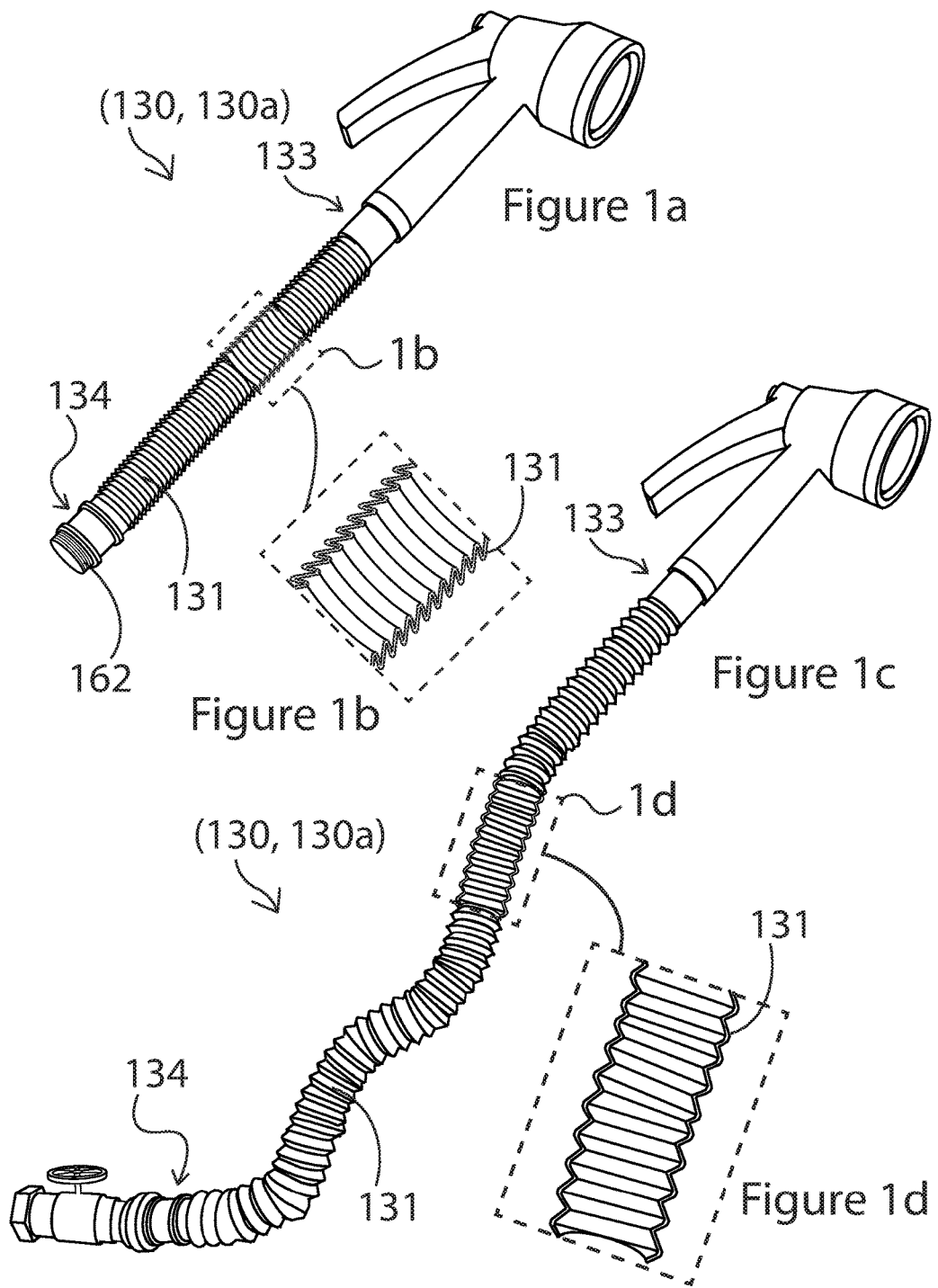

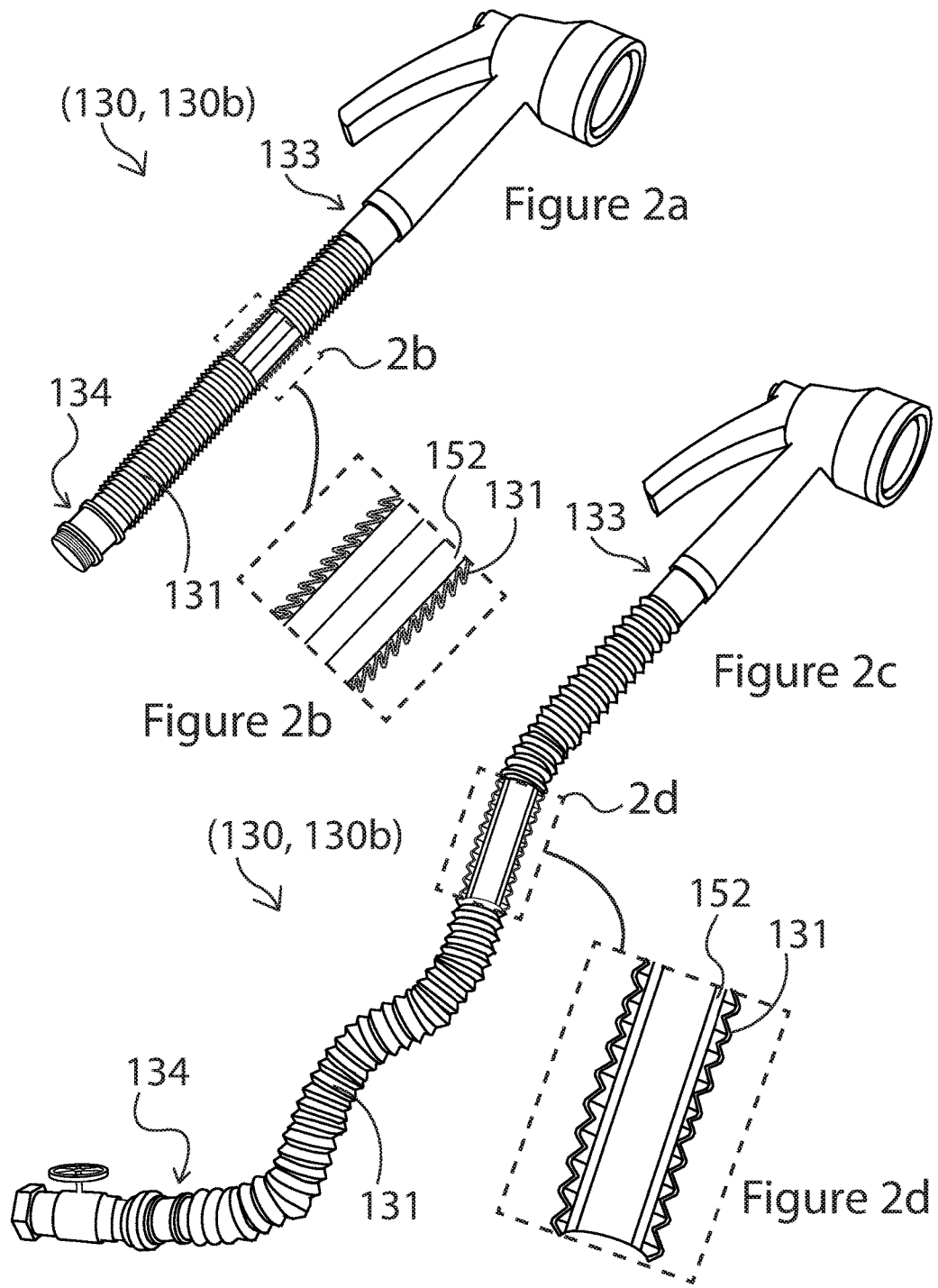

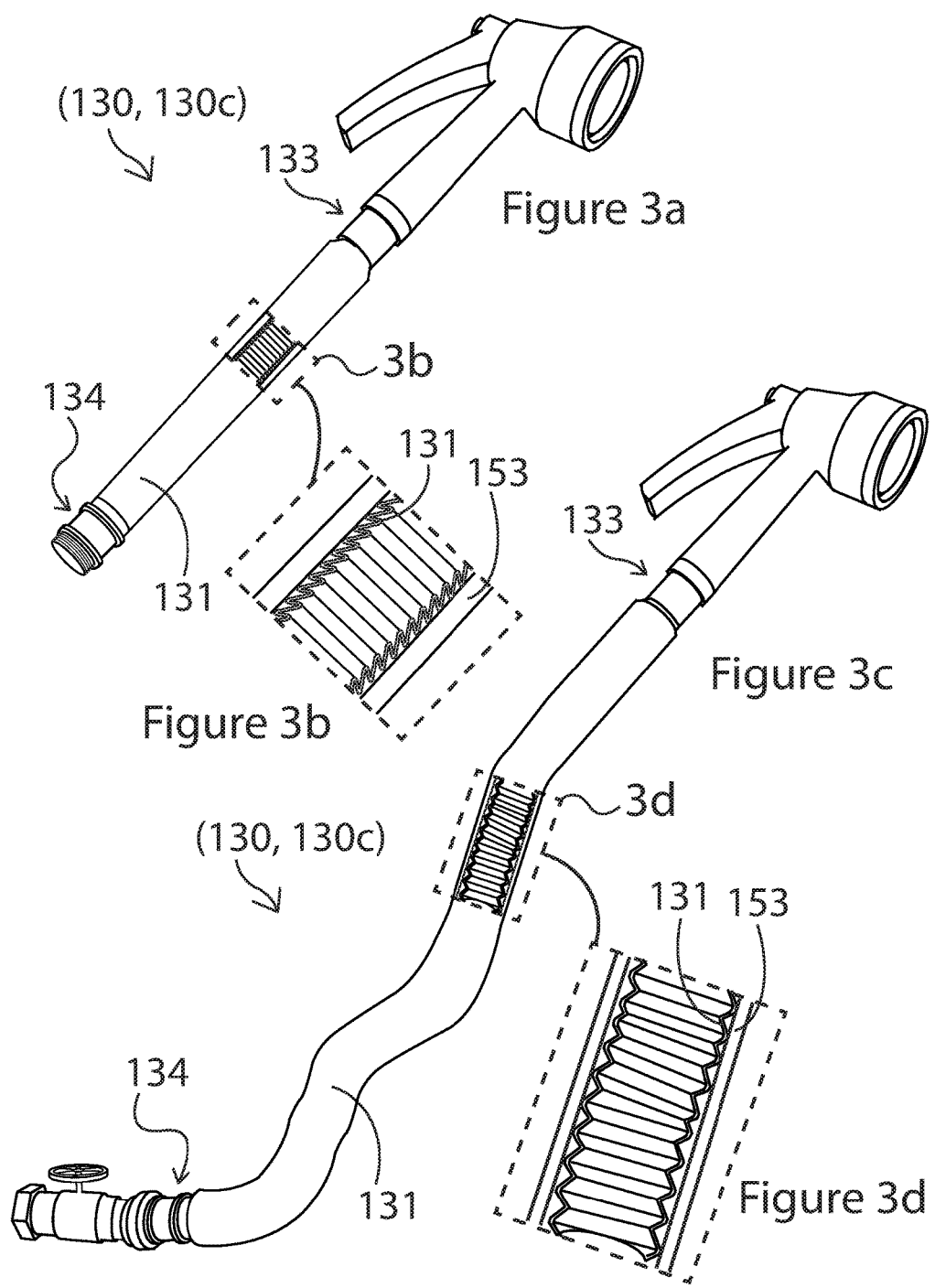

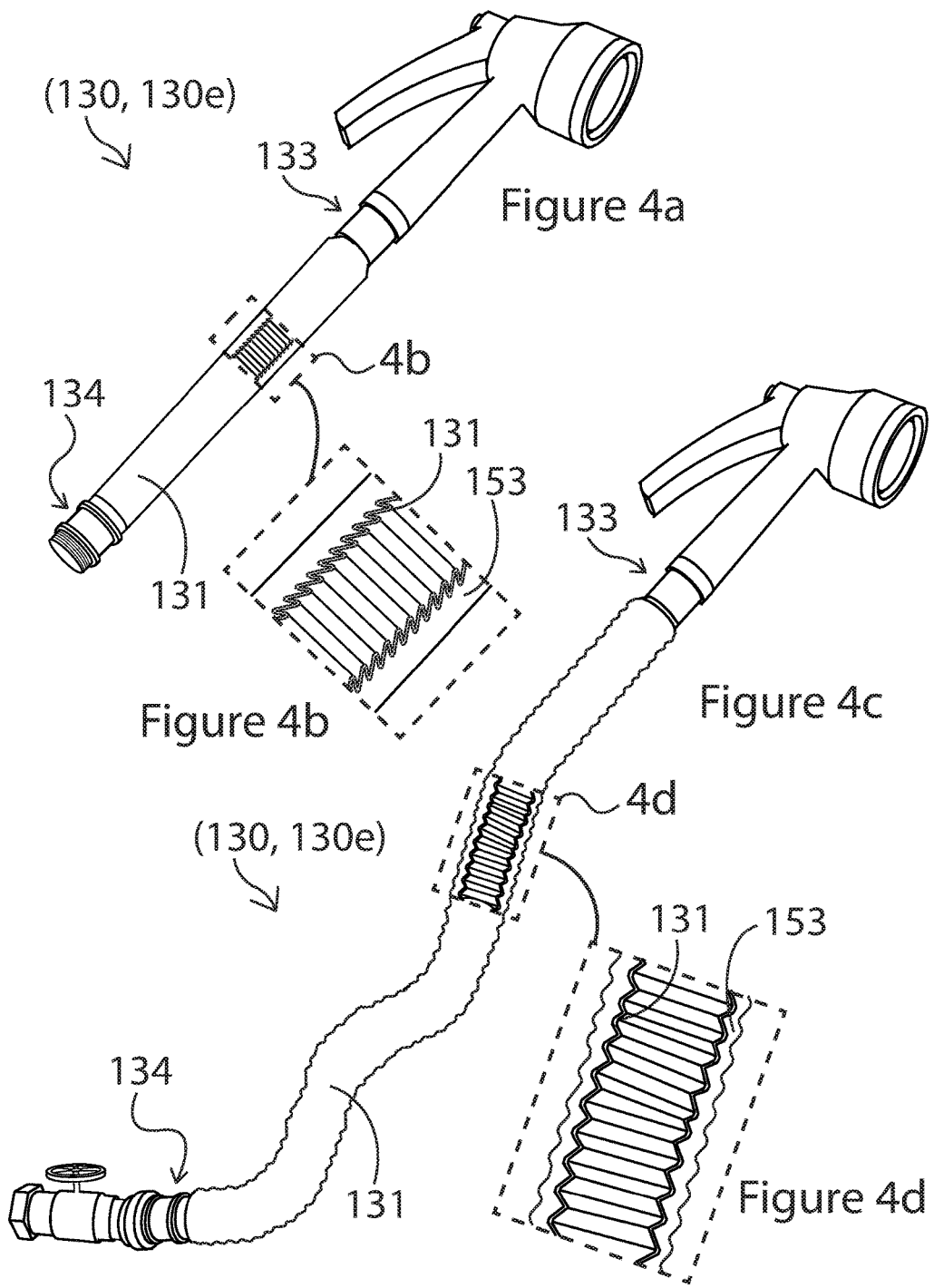

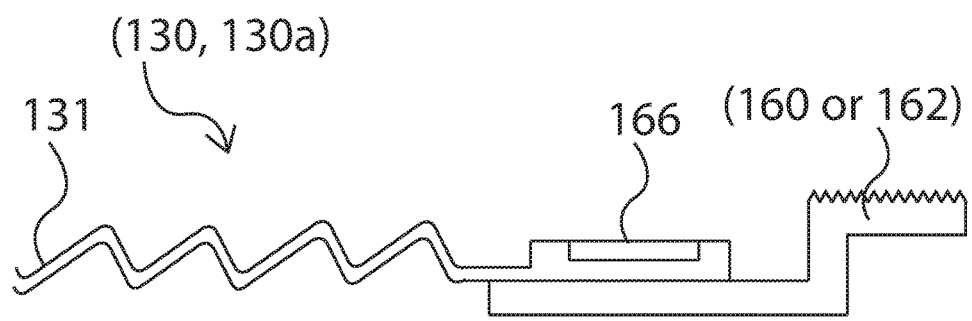
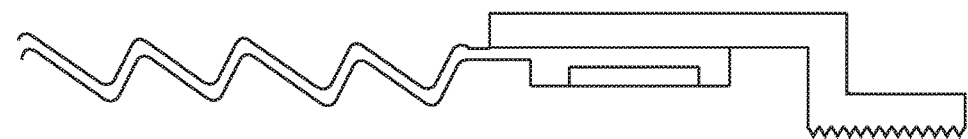
Figure 15a
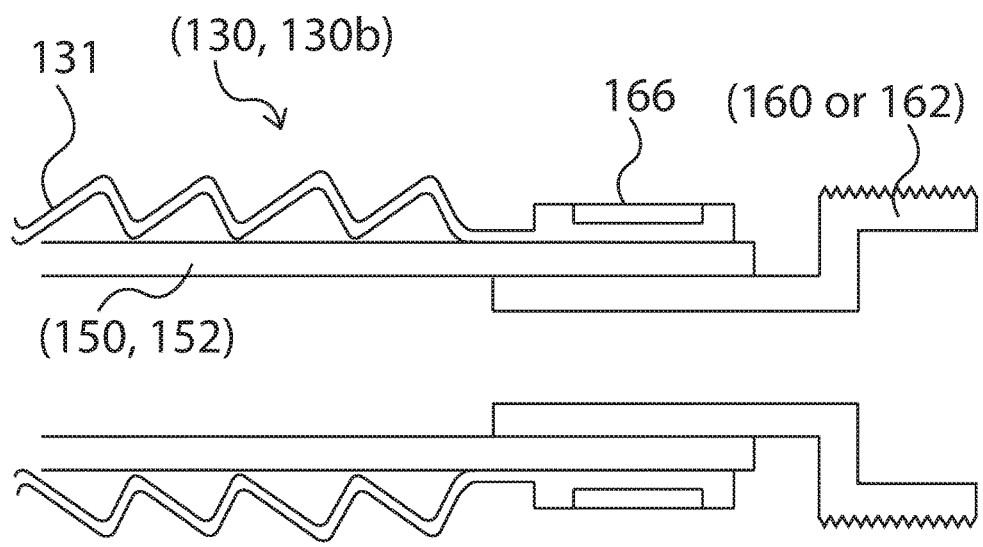
Figure 15b

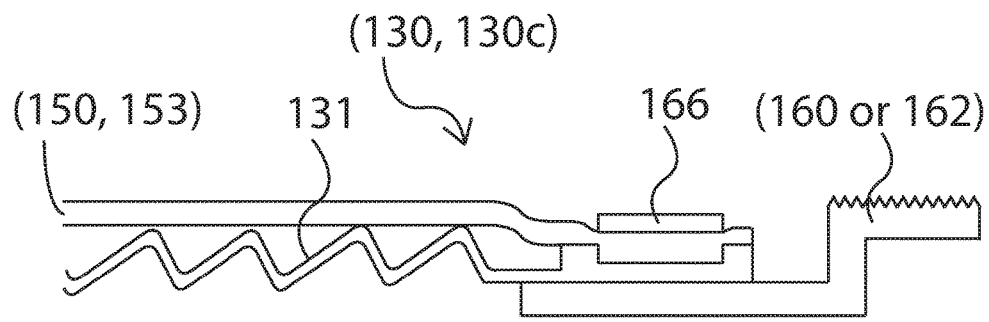
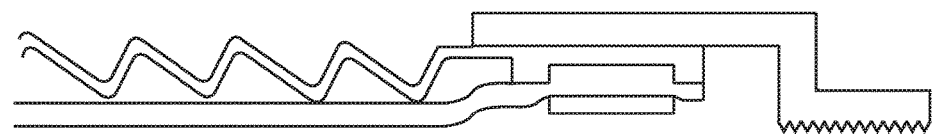
Figure 15c
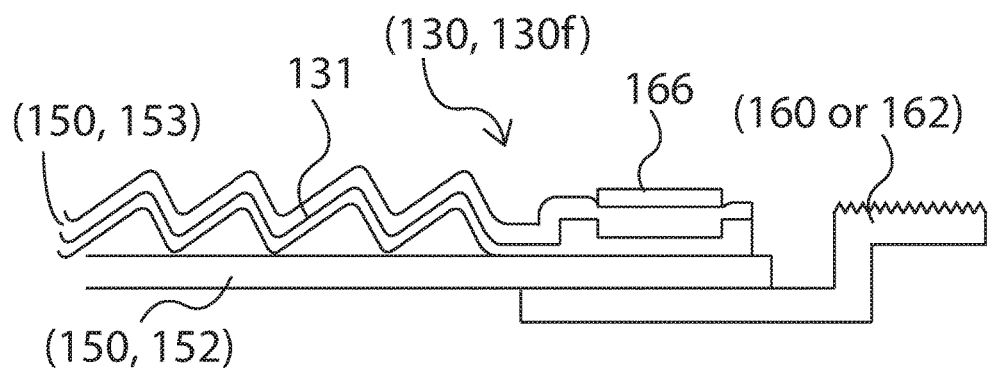
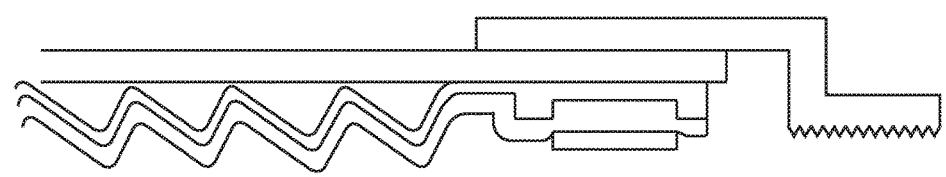
Figure 15d

Materials and Processing Parameters for Hose Memory

| Example | Material | Anneal Temperature Range (°C)* | Anneal Time (Mins) |
|---|---|---|---|
| 1 | Polyurethane | 115-135 | 30 |
| 2 | Polypropylene | 110-135 | 35 |
| 3 | Nylon | 110-135 | 35 |
| 4 | EVA (Ethyl Vinyl Acetate) | 75-100 | 30 |
| 5 | HDPE (High Density Polyethylene) | 75-110 | 30 |
| 6 | LDPE (Low Density Polyethylene) | 75-199 | 30 |
| 7 | Polyester | 135-175 | 30 |

* Temperature range may vary by 25-percent

Figure 19a

Materials and Processing Parameters for Elastic Materials

| Example | Material |
|---|---|
| 1 | Polyurethane |
| 2 | TPE (Thermoplastic Elastomer) |
| 3 | Latex |
| 4 | EDM Rubber |
| 5 | EVA (Ethyl Vinyl Acetate) |
| 6 | Vinyl |

Figure 19b

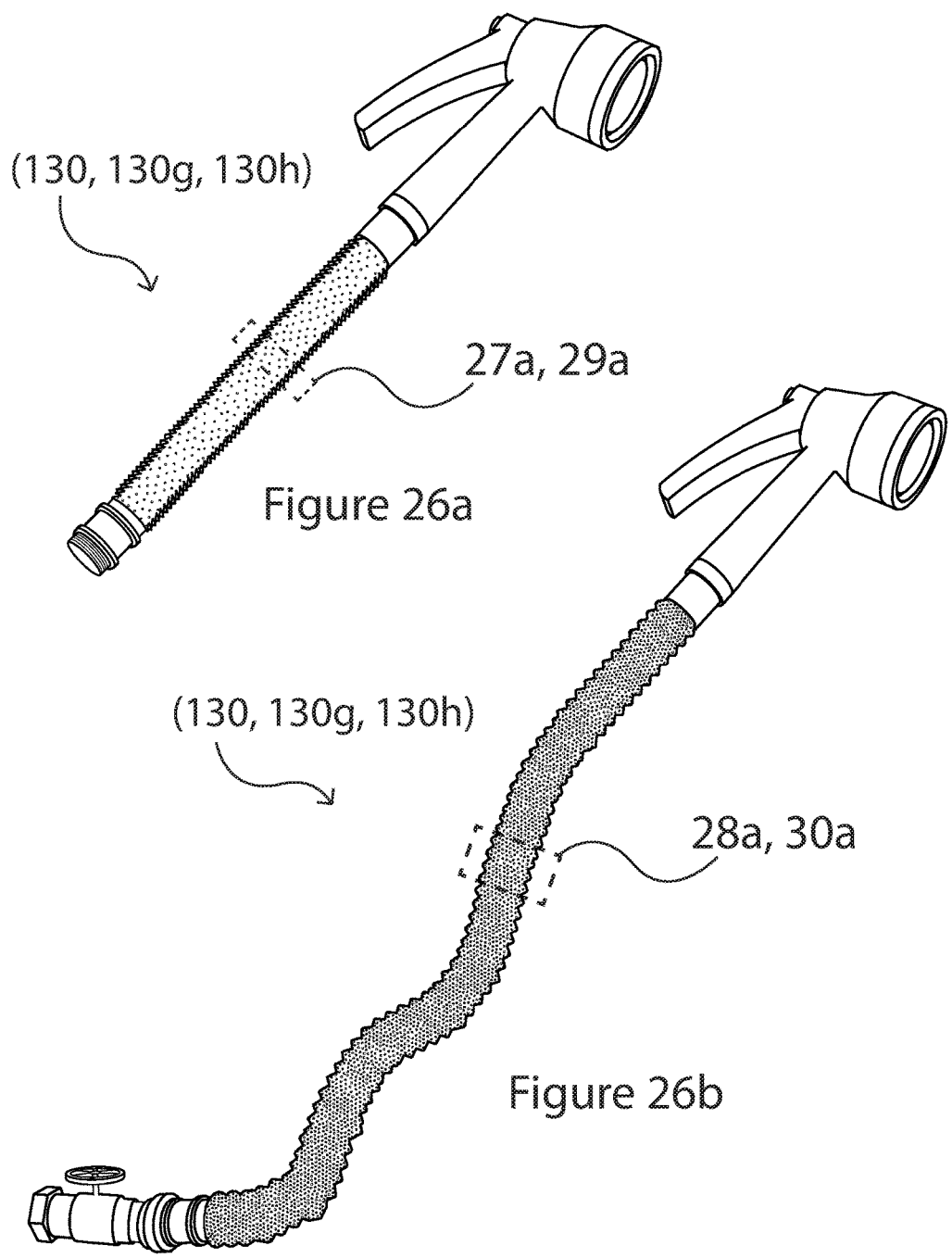

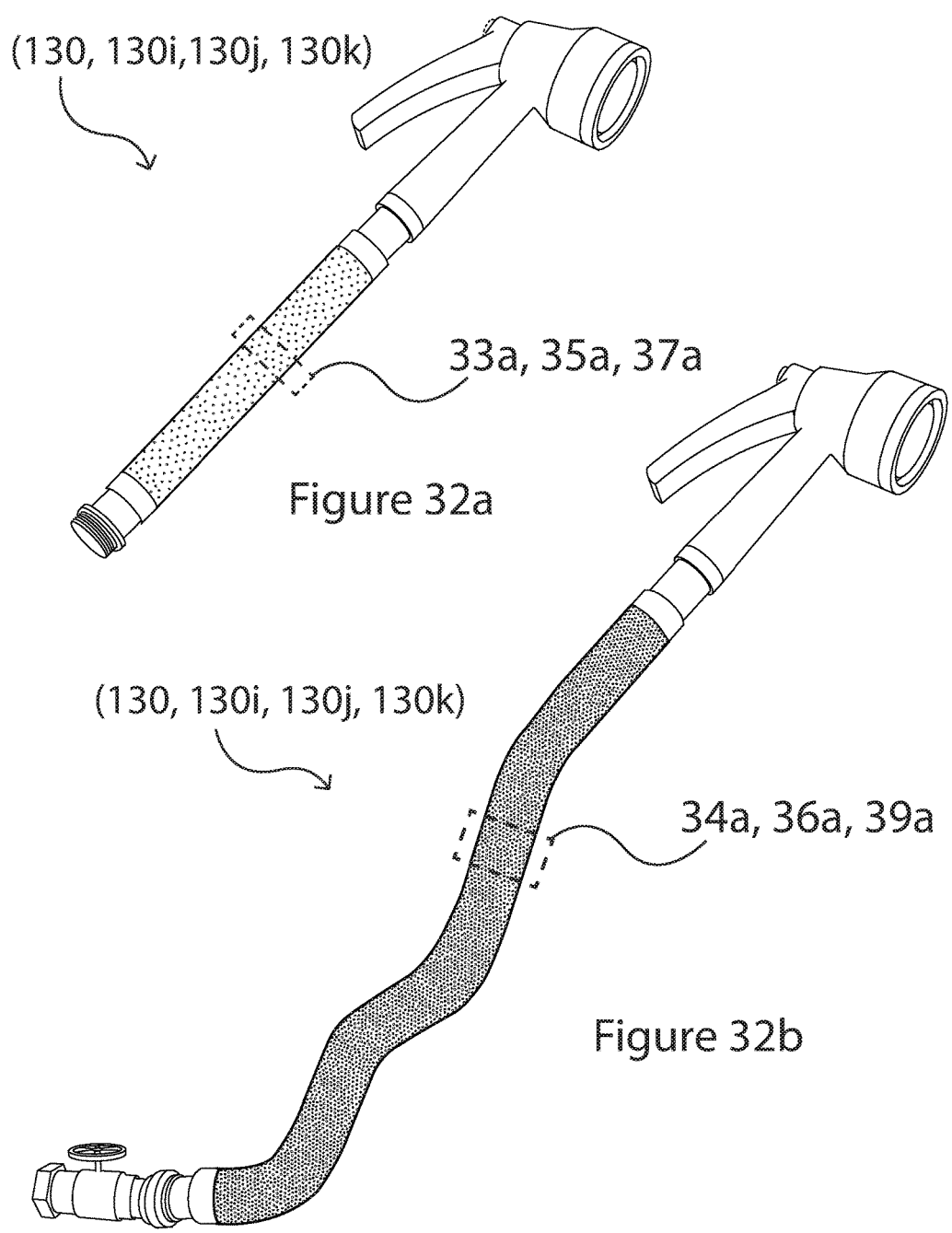

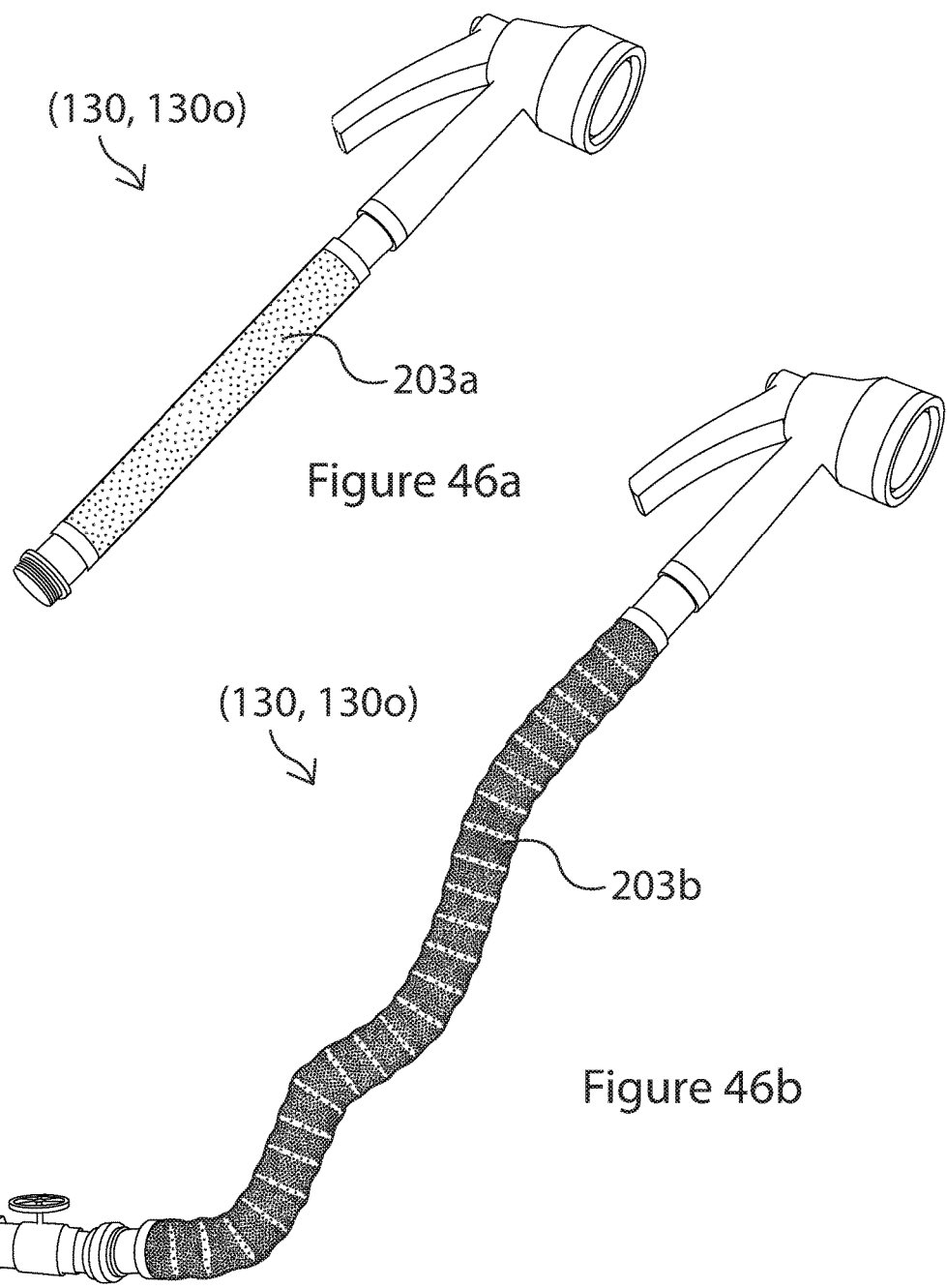

COLOR CHANGING HOSE

RELATED APPLICATIONS

This application is a continuation in part application of copending U.S. patent application Ser. No. 15/140,435 filed Apr. 27, 2016; which claims the benefit of priority of U.S. Provisional Patent Application No. 62/153,565, filed Apr. 28, 2015, the disclosures of which are both herein incorporated by reference. This patent application is also related to U.S. Design patent application Ser. No. 29/614,752, filed on Aug. 22, 2017, the disclosure of which is incorporated herein by reference.

FIELD

This patent application generally relates to a hose. More specifically, it relates to a hose that changes color or patterns of color as the hose expands and contracts or when water and/or pressure is passed through the hose.

BACKGROUND

Hard rubber watering hoses have been the standard for decades. They are heavy, not easy to handle and hard to store. More recently lighter weight expanding and contracting hoses have become popular as disclosed in U.S. Pat. Nos. 8,291,941 and 8,291,942 to Berardi. The present patent application aims to provide a novel expandable and contractible hose that is light-weight, durable, abrasion resistant, can endure high fluid pressure and can change color or color patterns with the amount of water within the hose.

SUMMARY

In one implementation, the present disclosure is directed to a hose that contracts and expands under the influence of fluid pressure from within. The hose comprises a segmented tubular wall circumscribing an interior; the segmented tubular wall has a first end, a second end and length. The segmented tubular wall is a plurality of contiguous segments. Each contiguous segment has a circumscribing apex lying within a transverse plane and defining an outer radius, a first wall segment angled from the apex towards the interior at a first angle from the transverse plane, and a second wall segment angled from the apex towards the interior at a second angle from the transverse plane. The first and second wall segments of adjacent contiguous segments terminate in a circumscribing trough defining an inner radius. The first and second wall segments extend from the same side of the transverse plane in a contracted state and extend from opposites sides of the transverse plane in an expanded state. A bias is provided to keep said first wall segment and second wall segment on the same side of the transverse plane in a contracted state. The bias may be a memory force built into the segmented tubular wall, an external bias that is located outside of the segmented tubular wall, an internal bias that is located within the interior of the segmented tubular wall, or a combination of any thereof.

In another implementation, the present disclosure is directed to a hose that contracts and expands under the influence of fluid pressure from within. The hose comprises a segmented tubular wall circumscribing an interior; the segmented tubular wall has a first end, a second end and length. The segmented tubular wall has a plurality of contiguous segments that each expand along the length of the segmented tubular wall with the application of pressure from within the interior. The hose further includes a bias to hold the continuous segments in a collapsed state when no pressure is applied from within said interior. The bias may be a memory force built into the segmented tubular wall, an external bias that is located outside of the segmented tubular wall, an internal bias that is located within the interior of the segmented tubular wall, or a combination of any thereof.

In yet another implementation, the present disclosure is directed to a hose having an observed color and length. The hose comprises a tubular wall having an interior, an exterior and a thickness. The observed hose color changes between a first hose color in a first state and a second hose color in a second state. Differences between the first state and second state may be the result of different expansions (first expansion state and second expansion state) of the hose, different pressure pressures (first pressure state and second pressure state) within the hose, differences in amount of fluid within the hose and different tensions states (first tension state and second tension state) for the hose. Observed color changes between the first state and second state may be a color change, a color shade change, alternating rings of at least two different colors or shades of color along the length of the hose, a color pattern change or even the generation of indicia.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 1*a* is a partial sectional, perspective view of a hose having a segmented tubular wall in the collapsed state as described in the present disclosure;

FIG. 1*b* is an enlarged view of the dashed section 1*b* outlined in FIG. 1*a*;

FIG. 1*c* is a partial sectional, perspective view of the hose in FIG. 1*a* in the expanded state;

FIG. 1*d* is an enlarged view of the dashed section 1*d* outlined in FIG. 1*c*;

FIG. 2*a* is a partial sectional, perspective view of the hose in FIG. 1*a* further including an internal elastic wall as an internal bias;

FIG. 2*b* is an enlarged view of the dashed section 2*b* outlined in FIG. 2*a*;

FIG. 2*c* is a partial sectional, perspective view of the hose in FIG. 2*a* in the expanded state;

FIG. 2*d* is an enlarged view of the dashed section 2*d* outlined in FIG. 2*c*;

FIG. 3*a* is a partial sectional, perspective view of the hose in FIG. 1*a* further including an external elastic wall of a sleeve as an external bias;

FIG. 3*b* is an enlarged view of the dashed section 3*b* outlined in FIG. 3*a*;

FIG. 3*c* is a partial sectional, perspective view of the hose in FIG. 3*a* in the expanded state;

FIG. 3*d* is an enlarged view of the dashed section 3*d* outlined in FIG. 3*c*;

FIG. 4*a* is a partial sectional, perspective view of the hose in FIG. 1*a* further including an external elastic layer bonded to the segmented tubular wall, the external elastic layer acting as an external bias;

FIG. 4*b* is an enlarged view of the dashed section 4*b* outlined in FIG. 4*a*;

FIG. 4*c* is a partial sectional, perspective view of the hose in FIG. 4*a* in the expanded state;

FIG. 4d is an enlarged view of the dashed section 4d outlined in FIG. 4c;

FIG. 6b is a side, sectional view of the segmented tubular wall shown in FIG. 6a;

FIG. 7b is a side, sectional view of the segmented tubular wall shown in FIG. 7a;

FIG. 9b is a side, sectional view of the segmented tubular wall in FIG. 9a;

FIG. 10b is a side, sectional view of the segmented tubular wall in FIG. 10a;

FIG. 15a is a side, sectional view of one embodiment of a coupler that may be added to an end of the hose in FIGS. 1a and 1c;

FIG. 15b is a side, sectional view of one embodiment of a coupler that may be added to the hose in FIGS. 2a and 2c;

FIG. 15c is a side, sectional view of one embodiment of a coupler that may be added to the hose in FIGS. 3a and 3c;

FIG. 15d is a side, sectional view of one embodiment of a coupler that may be added to the hose having both an internal and external bias;

FIG. 19a is a table listing various materials and processing parameters that may be used to form the expanding and contracting segmented tubular wall shown in FIGS. 1a-4d and 13a-13b;

FIG. 19b is a table listing various elastic materials that may be used to form the internal and external biasing elements;

FIG. 22b is a side, sectional view when pressurized fluid fills the hose shown in FIG. 22a;

FIG. 22c is a side, sectional view when unpressurized fluid fills the hose shown in FIG. 22a;

FIG. 23b is a side, sectional view when pressurized fluid fills the hose shown in FIG. 23a;

FIG. 23c is a side, sectional view when unpressurized fluid fills the hose shown in FIG. 23a;

FIG. 24b is a side, sectional view when pressurized fluid fills the hose shown in FIG. 24a;

FIG. 24c is a side, sectional view when unpressurized fluid fills the hose shown in FIG. 24a;

FIG. 25b is a side, sectional view when pressurized fluid fills the hose shown in FIG. 25a;

FIG. 25c is a side, sectional view when unpressurized fluid fills the hose shown in FIG. 25a;

FIG. 26a is perspective view of one embodiment of the hoses of either FIG. 1a or 2a having color changing properties;

FIG. 26b is a perspective view of one embodiment of the hoses of either FIG. 1c or 2c having color changing properties;

FIG. 27b is a sectional view of the hose in FIG. 27a;

FIG. 28b is a sectional view of the hose in FIG. 28a;

FIG. 29b is a sectional view of the hose in FIG. 29a;

FIG. 30b is a sectional view of the hose in FIG. 30a;

FIG. 31b is a sectional view of the hose in FIG. 31a;

FIG. 32a is perspective view of one embodiment of the hose of FIG. 3a or alternative hose structures having color changing properties;

FIG. 32b is a perspective view of one embodiment of the hoses FIG. 3c or alternative hose structures having color changing properties;

FIG. 33b is a sectional view of the hose in FIG. 33a;

FIG. 34b is a sectional view of the hose in FIG. 34a;

FIG. 35b is a sectional view of the hose in FIG. 35a;

FIG. 36b is a sectional view of the hose in FIG. 36a;

FIG. 37b is a sectional view of the hose in FIG. 37a;

FIG. 38b is a sectional view of the hose in FIG. 38a;

FIG. 39b is a sectional view of the hose in FIG. 39a;

FIG. 41b is a sectional view of the hose in FIG. 41a;

FIG. 42b is a sectional view of the hose in FIG. 42a;

FIG. 43b is a sectional view of the hose in FIG. 43a;

FIG. 44b is a sectional view of the hose in FIG. 44a;

FIG. 46a is perspective view of one embodiment of a hose having color changing properties; and FIG. 46b is a perspective view of one embodiment of a hose having color changing properties that include the creation of a pattern change that can be stripes along the length of the hose;

DETAILED DESCRIPTION

FIGS. 1a-25c illustrate various aspects of expandable and contractible hose 130 having multiple embodiments 130a-130f Hose 130 may additionally have color changing properties and associated structures that support those color changing properties as shown in embodiments 130g-130n, FIGS. 26a-45b.

Figure 5A:
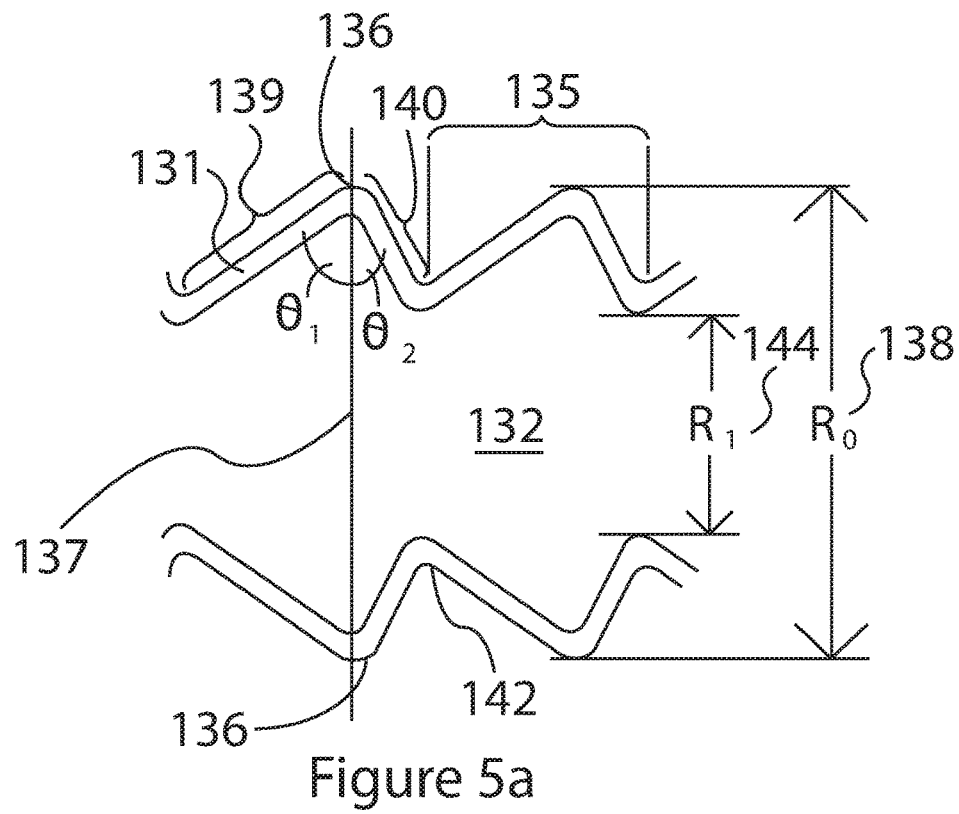
FIG. 5a is a side, sectional schematic view of two contiguous segments of the segmented tubular wall of FIGS. 1c, 2c, 3c and 4c illustrating various elements of the segmented tubular wall in the expanded state.
Figure 5B:
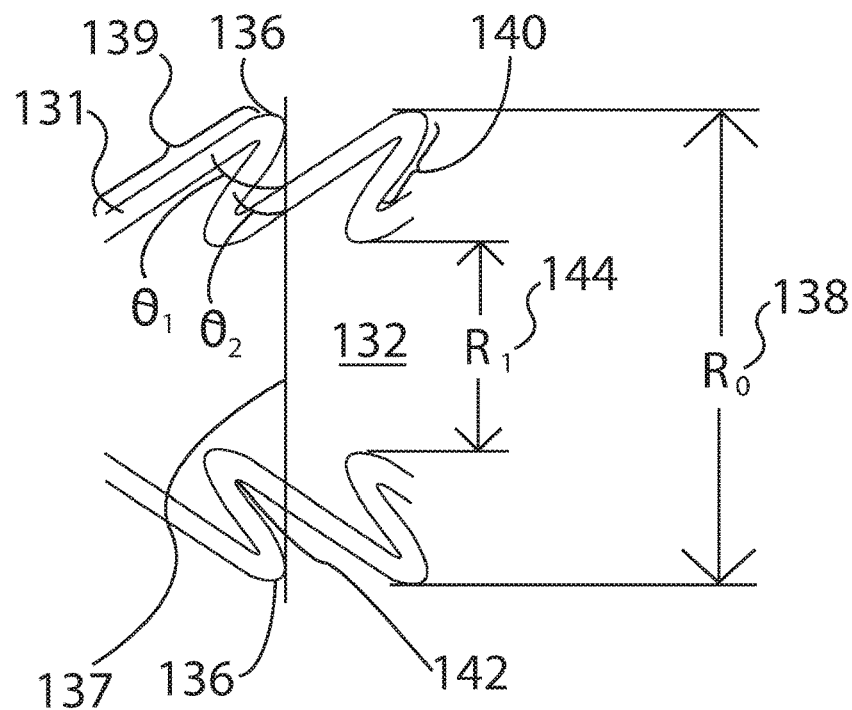
FIG. 5b is a side, sectional schematic view of two contiguous segments of the segmented tubular wall of in FIGS. 1a, 2a, 3a and 4a illustrating various elements of the segmented tubular wall in the contracted state.
Figure 6A:
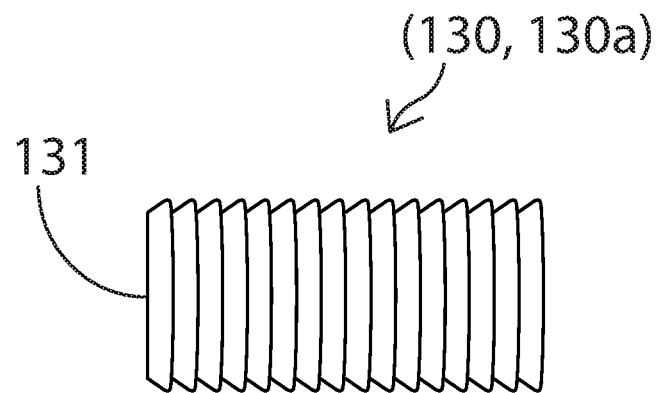
FIG. 6a is a side view of a section of the segmented tubular wall of FIGS. 1a, 2a, 3a and 4a in the contracted state.
Figure 6B:
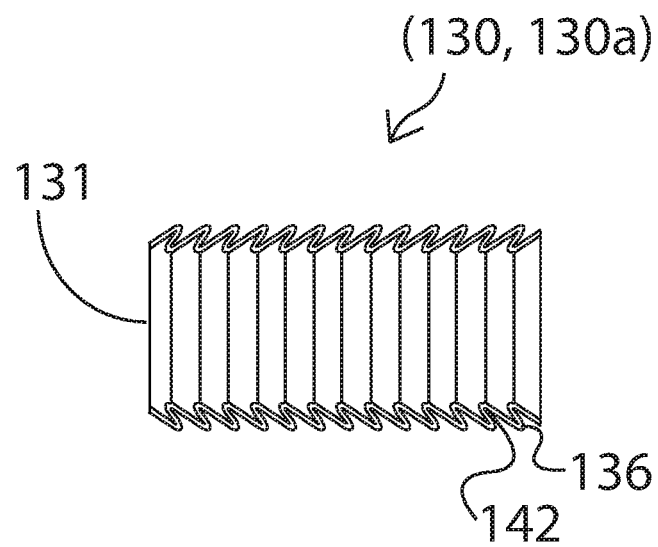
Figure 7A:
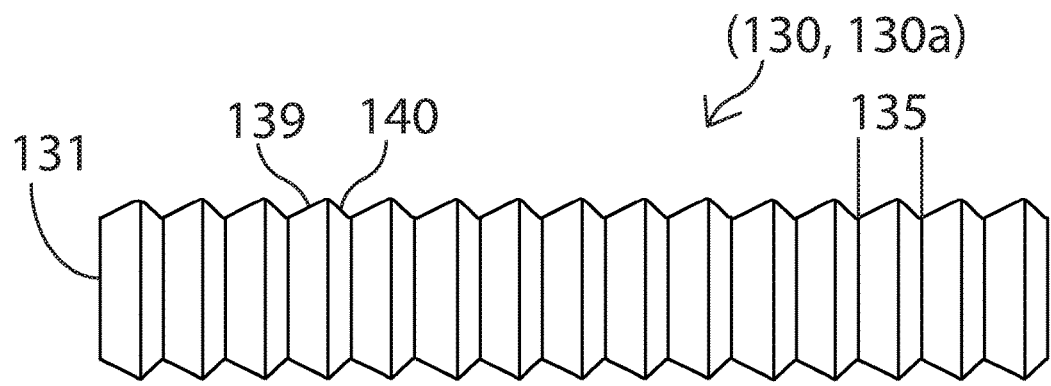
FIG. 7a is side view of a section of the segmented tubular wall of FIGS. 1c, 2c, 3c and 4c in the expanded state.
Figure 7B:
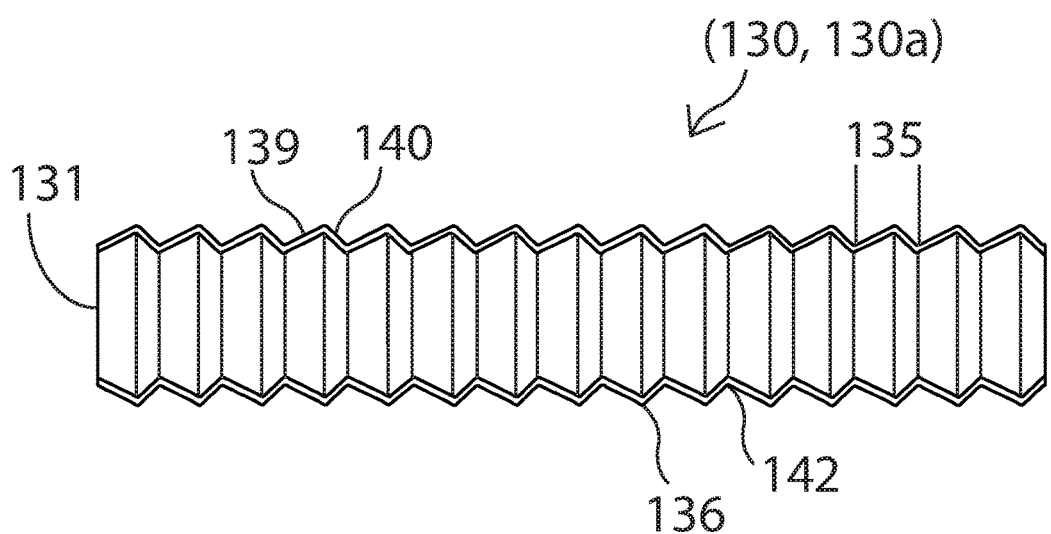

In one embodiment hose 130 comprises a segmented tubular wall 131 circumscribing an interior 132. Segmented tubular wall 131 has a first end 133, a second end 134 and length. Segmented tubular wall 131 is a plurality of contiguous segments 135. Each contiguous segment 135 has a circumscribing apex 136 lying within a transverse plane 137 and defining an outer radius 138, a first wall segment 139 angled from apex 316 towards interior 132 at a first angle $\theta_1$ from transverse plane 137, and a second wall segment 140 angled from apex 136 towards interior 132 at a second angle $\theta_2$ from transverse plane 137. Transverse plane 137 is generally perpendicular to the length of the hose. First wall and second wall segments of adjacent contiguous segments terminate in a circumscribing trough 142 defining an inner radius 144. First wall segment 139 and second wall segment 140 extend from the same side of transverse plane 137 in a contracted state (FIG. 5b) and extend from opposites sides of the transverse plane in an expanded state (FIG. 5a).

First wall segments 139 and second wall segments 140 are each generally sections of a conical surface and more particularly frustum of a right cone. Each pair of wall segments (139, 140), making up a contiguous segment 135, is generally equally spaced in the contracted state or in the expanded state. Also, each contiguous segment 135 is preferably identically shaped so they can collapse and stack tightly together in the collapsed state.

The ability of hose 130 to expand and contract is a property of second angle $\theta_2$ being less than first angle $\theta_1$ in both the expanded and contracted states. Second wall segment 140 can flip back and forth across transverse plane 137 to create a shorter length hose in the contracted state and a longer length hose in the expanded state. Application of pressure from within interior 132 in conjunction with bias 150 work together to cause second angle $\theta_2$ to transition from one side to the other side of transverse plane 137. First angle $\theta_1$ and second angle $\theta_2$ combine to form an expansion angle having a magnitude of close to zero in the collapsed state and greater than 30-degrees in the expanded state.

Figure 8:
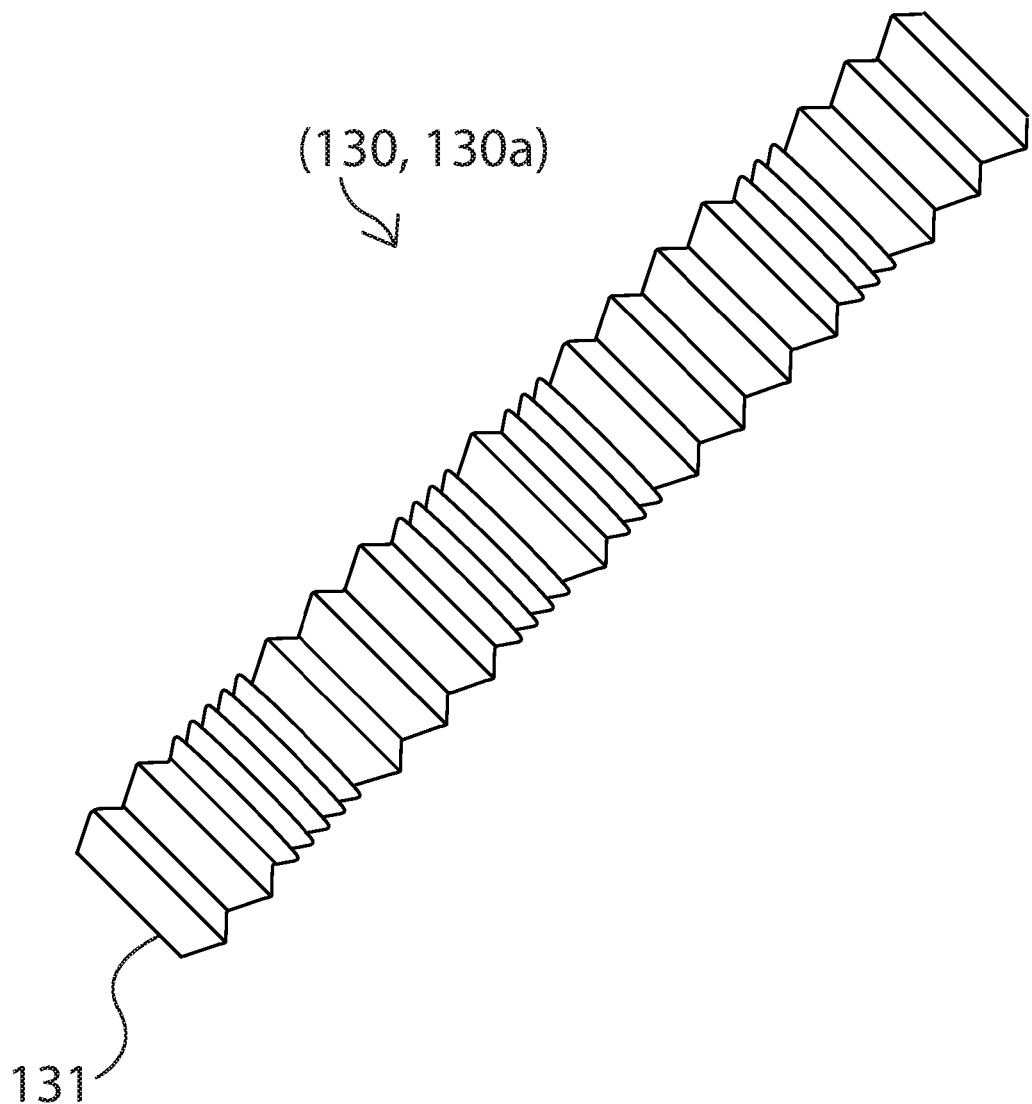
FIG. 8 is a side view of a section of the segmented tubular wall shown in FIGS. 1a-4d depicting one embodiment of how the contiguous segments of the hose may expand and contract.

Segmented tubular wall 131 generally has an elongation ratio, the length in the expanded state to the length in the contracted state, that is generally greater than 2:1 and preferably in the range of 3:1 to 10:1. The expansion ratio is a function of the angle of each segment relative to transverse plane 137 and the length of each wall segment (139, 140). First angle $\theta_1$ and second angle $\theta_2$ may retain relatively low angles to retain a significantly grooved structure or expand all the way to 90-degrees to give a generally smooth segmented tubular wall depending on the material, wall thickness and pressure within said segmented tubular wall. Contiguous segments 135 may expand and contract independently of other contiguous segments, as depicted in FIG. 8, so that the length of hose 130 increases in discrete increments. Alternatively, contiguous segments 135 may expand and contract equally to have the length of hose 130 increase or decrease continuously.

Hose 130 comprises some type of bias 150 that is required to keep first wall segment 139 and second wall segment 140 on the same side of transverse plane 137 in the contracted state, but allow the first wall segment and second wall segment to lie on opposite sides of the transverse plane when in an expanded state. Bias 150 may be an intrinsic bias that is inherently built into segmented tubular wall 131 such as a material memory force built into the segmented tubular wall. A hose 130a based on such an intrinsic bias is shown in FIGS. 1a-1d and 22a-22c.

Bias 150 may be an internal bias from an internal biasing element 152. Internal biasing element 152 may be any internal biasing element such as a spring, an elastic strip, an elastic coating, an elastic tube or other elastic material structure having an elastic wall, etc. A hose 130b based on one such internal bias, specifically an internal elastic tube having an internal elastic wall, is shown in FIGS. 2a-2d, 11a-11b and 23a-23c.

Figure 12A:
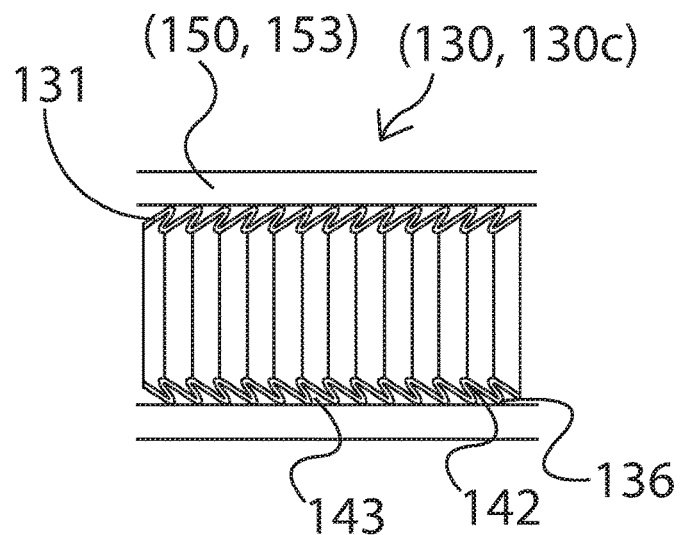
FIG. 12a is a side, sectional view of a section of hose of FIG. 3a in the contracted state showing both the segmented tubular wall and external elastic tubular wall as a sleeve.
Figure 12B:
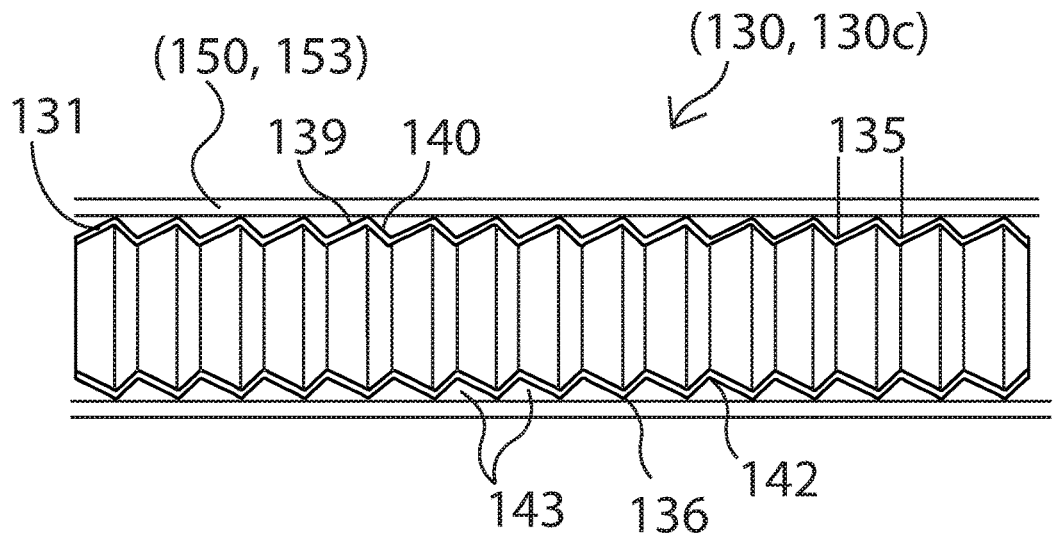
FIG. 12b is a side, sectional view of the section of hose of FIG. 12a in the expanded state.
Figure 13A:
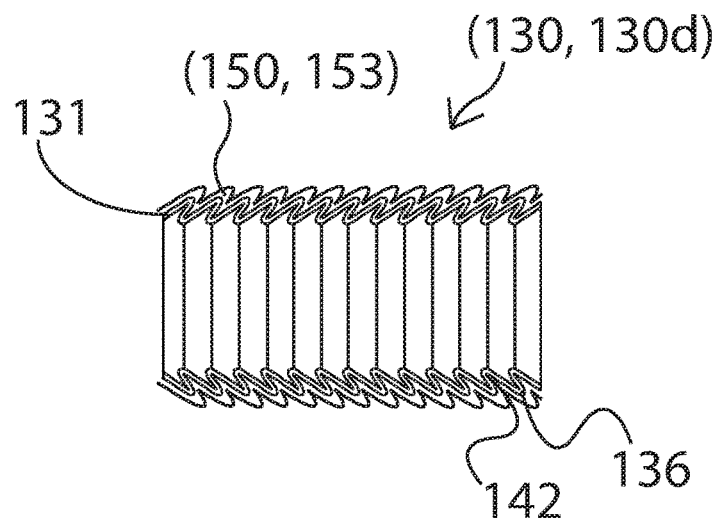
FIG. 13a is a side, sectional view of an alternative embodiment of a section of hose of FIG. 3a in the contracted state showing both the segmented tubular wall and an external elastic wall as an elastic coating.
Figure 13B:
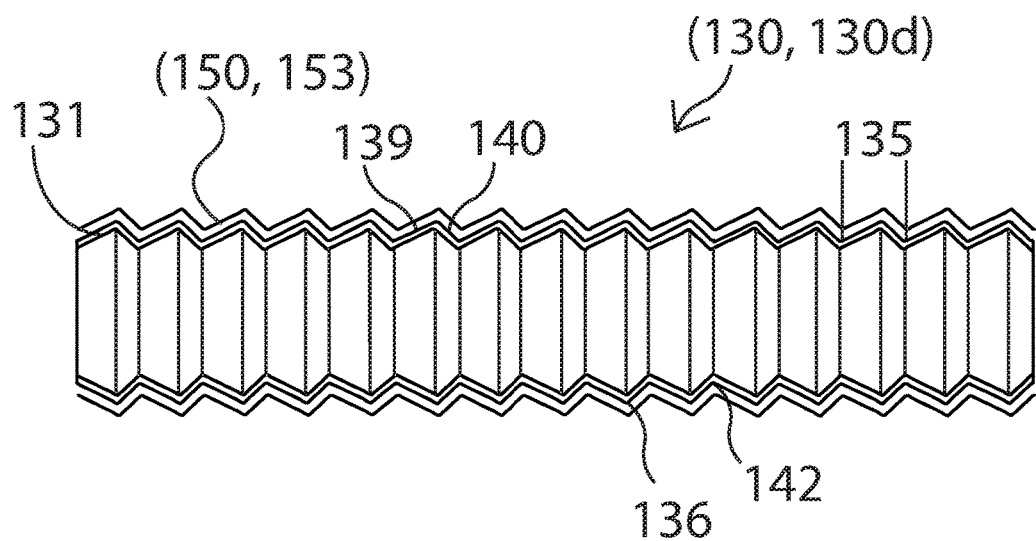
FIG. 13b is a side, sectional view of the section of hose of FIG. 13a in the expanded state.
Figure 14A:
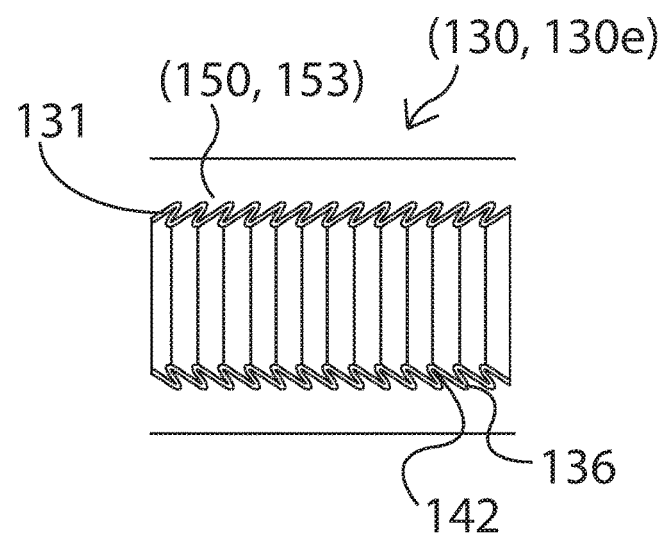
FIG. 14a is a side, sectional view of a section of hose of FIG. 4a in the contracted state showing both the segmented tubular wall and an external elastic wall as a bonded layer.
Figure 14B:
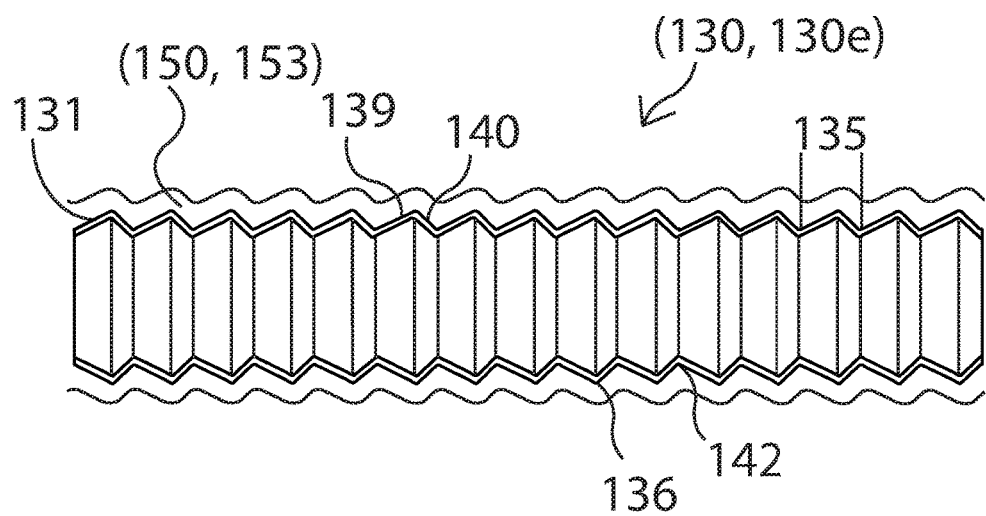
FIG. 14b is a side, sectional view of the section of hose of FIG. 14a in the expanded state.

Bias 150 may be an external bias from an external biasing element 153. External biasing element 153 may be any external biasing element such as a spring, an elastic coating, an elastic layer, co-extruded elastic layer, a dipped or sprayed elastic coating or layer, an elastic material having an elastic wall, etc. External biasing element 153 may be a sleeve that freely moves independently over segmented tubular wall 131. External biasing element 153 may be partially bonded to some or all of the contiguous segments. External biasing element 153 may also be bonded everywhere to segmented tubular wall 131. For example, FIGS. 12a and 12b show how an external elastic layer (150, 153) may be bonded at apex 136 of each contiguous segment 135 with air gaps 143 between the external elastic layer and segmented tubular wall 131 at said troughs 142. A hose 130c based on one type of external bias, an external elastic sleeve having an external elastic wall, is shown in FIGS. 3a-3d and 12a-12b and 24a-24b. A hose 130e based on another type of external bias, an external elastic layer at least partially bonded to segmented tubular wall 131, is shown in FIGS. 4a-d,13a-14b and 25a-25c. The external elastic layer may be integrally bonded to the entire segmented tubular wall or partially bonded with some air gaps. The external elastic layer may be porous to allow air to easily flow to create air gaps or the external elastic layer may be nonporous. It is noted that hose 130 (130a, 130b, 130c, 130d, 130e, 130f) all include a segmented tubular wall 131 that may or may not have an inherently built-in bias that may then work in conjunction with an additional internal or external bias to help expand and contract the hose. Therefore hose 130 may have any combination of an intrinsic bias, an internal bias and an external bias.

Figure 9A:
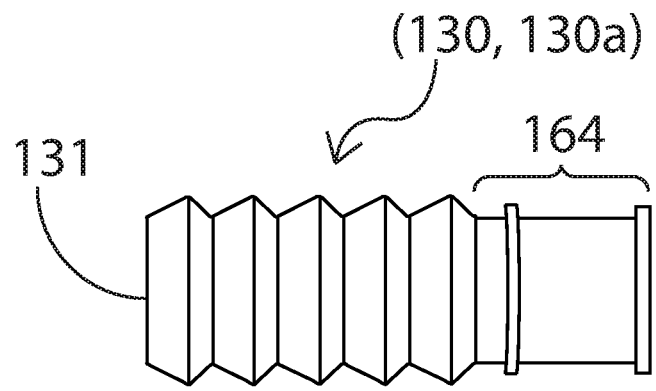
FIG. 9a is a side view of the segmented tubular wall in FIG. 1c, showing one embodiment of the end structure of the hose.
Figure 9B:
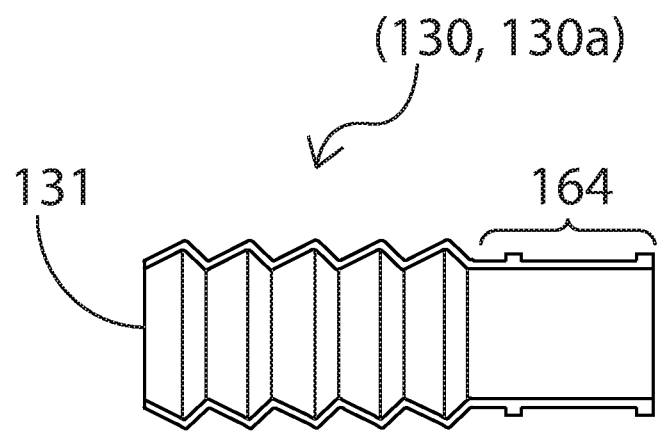
Figure 10A:
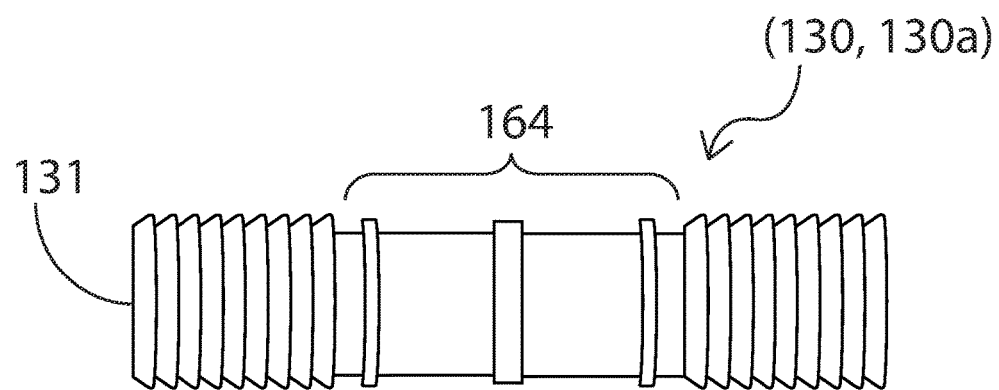
FIG. 10a is a side view showing an embodiment of the segmented tubular wall in FIGS. 1a, 2a, 3a and 4a with several contiguous segments replaced with a straight element.
Figure 10B:
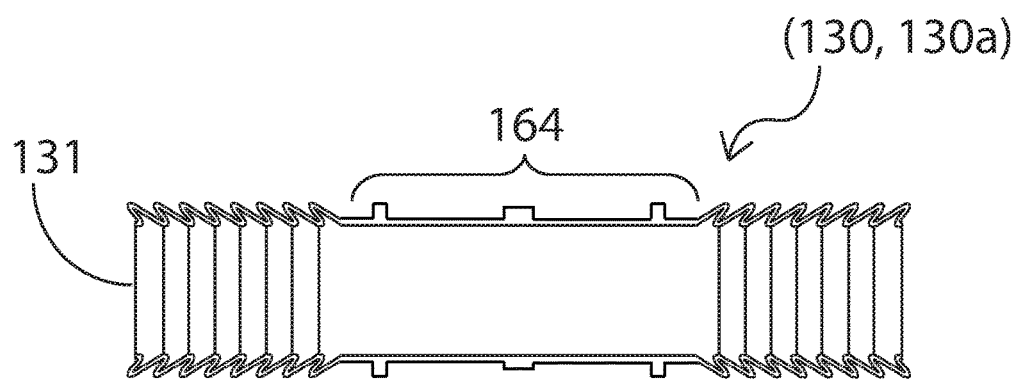
Figure 11A:
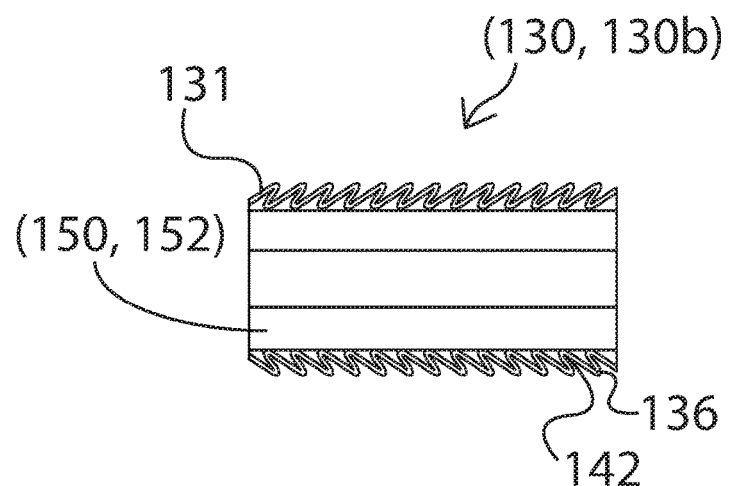
FIG. 11a is a side, sectional view of a section of hose of FIG. 2a in the contracted state showing both the segmented tubular wall and internal elastic tubular wall.
Figure 11B:
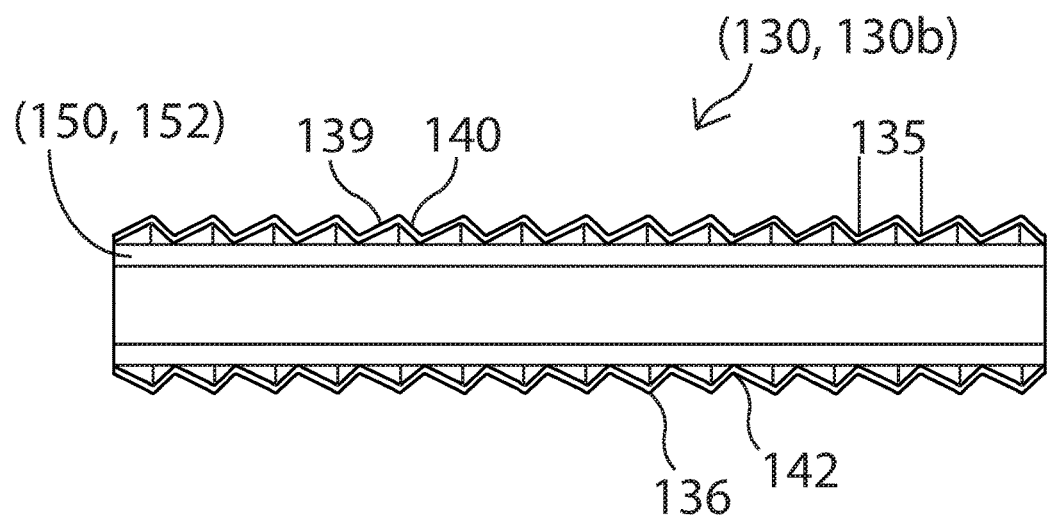
FIG. 11b is a side, sectional view of the section of hose of FIG. 11a in the expanded state.
Figure 15E:
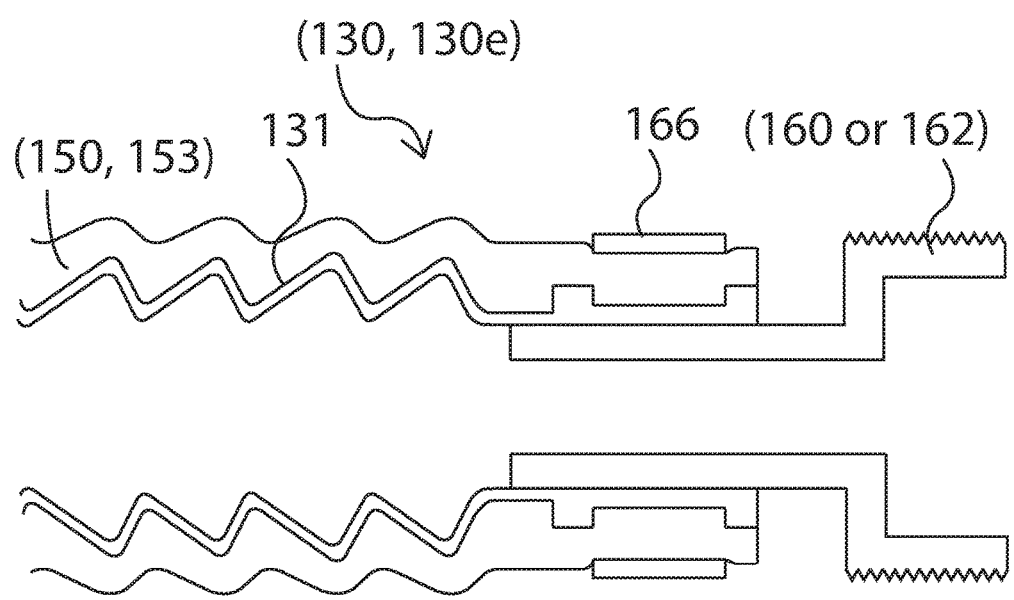
FIG. 15e is a side, sectional view of one embodiment of a coupler that may be added to the hose in FIGS. 4a and 4c.

In order to use hose 130 for different applications, the hose may include a first coupler 160 on first end 133 and a second coupler 162 on said second end 134. Hose 130 may include a wide variety of couplers and not those just shown in FIGS. 15a-15e. To aid in attaching couplers (160, 162) to hose 130, the hose may be produced with straight sections 164 as shown in FIGS. 10a and 10b where the straight sections are at specified lengths along the length of the fabricated hose. Straight sections 164 are then cut at the midpoint of the straight section. This produces a straight section 164 at both ends of hose 130 as shown in FIGS. 9a and 9b. FIGS. 15a-15e show five embodiments of how couplers (160, 162) may be integrated with hose 130. In FIG. 15a, straight section 164 of hose 130a is slipped over the coupler and secured with adhesive, thermal bonding or a compression fitting 166. In the embodiment of hose 130b where an internal elastic tube is used as the internal biasing element 152, elastic tube may be fitted over the coupler and straight section 164 of the hose fitted over the internal elastic tube, FIG. 15b. Again the straight section 164 and internal elastic tube may be secured to couplers (160, 162) with adhesive, thermal bonding, a compression fitting 166 or a barbed/ribbed fitting. In the embodiment of hose 130c where an external elastic tube is used as the external biasing element 153, the external elastic tube may be fitted over the coupler and straight section 164 of the hose, FIG. 15c. The straight section 164 and external elastic tube 153 may be secured to couplers (160, 162) with adhesive, thermal bonding, a compression fitting 166 or a barbed/ribbed fitting. In the embodiment of hose, 130e, where an external elastic layer is used as the external biasing element 153, the external elastic layer may be fitted over the coupler and straight section 164 of the hose, FIG. 15e. Again the straight section 164 and external elastic layer 153 may be secured to couplers (160, 162) with adhesive, thermal bonding, a compression fitting 166 or a barbed/ribbed fitting. FIG. 15d alternatively shows a hose structure 30f having both an internal bias element 152 and an external bias element 153 joined to a coupler (160, 162). For all hoses 30b-30f it is also possible to have each internal bias element 152 and external bias element 153 directly joined to segmented tubular wall 131 and the segmented tubular wall by itself joined to couplers (160, 162). Alternatively, each internal bias element 152, external bias element 153 and segmented tubular wall 131 may each be joined separately to couplers (160, 162).

Figure 16:
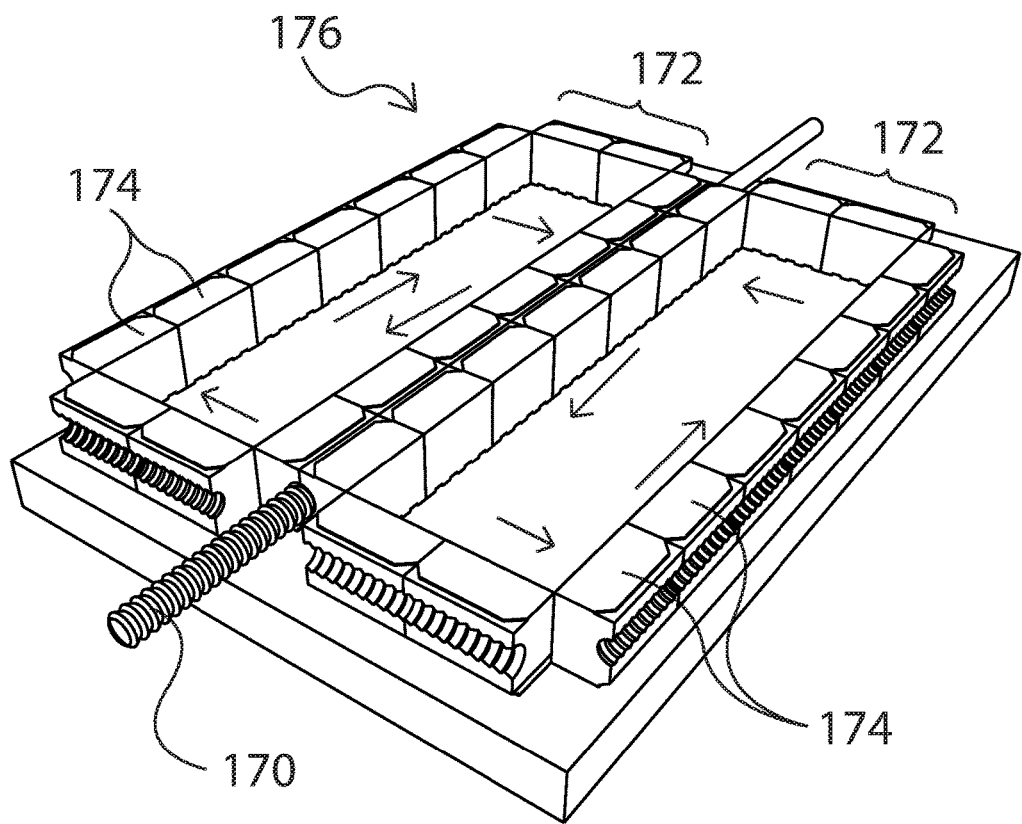
FIG. 16 is a perspective view illustrating one embodiment of tooling used to process a segmented tubular hose structure that is a precursor to the segmented tubular wall shown in FIGS. 1a-4d and 13a-13b.
Figure 17:
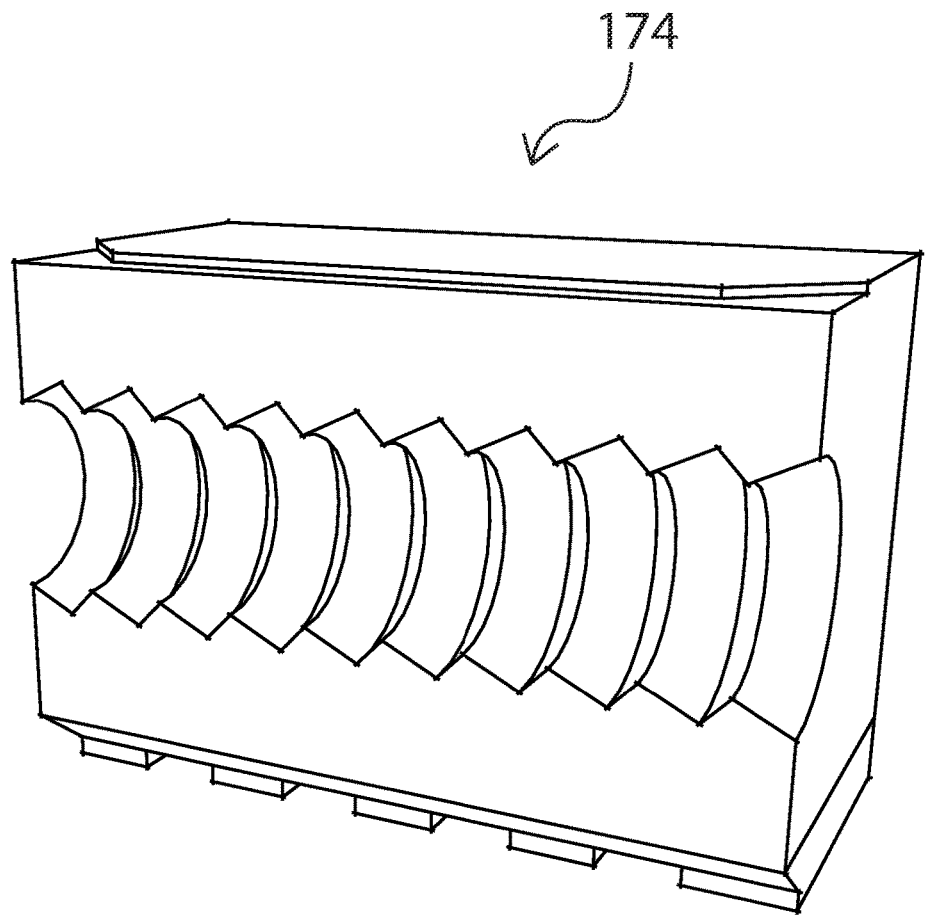
FIG. 17 is a perspective view of a mold block used in conjunction with the tooling illustrated in FIG. 16.
Figure 18A:
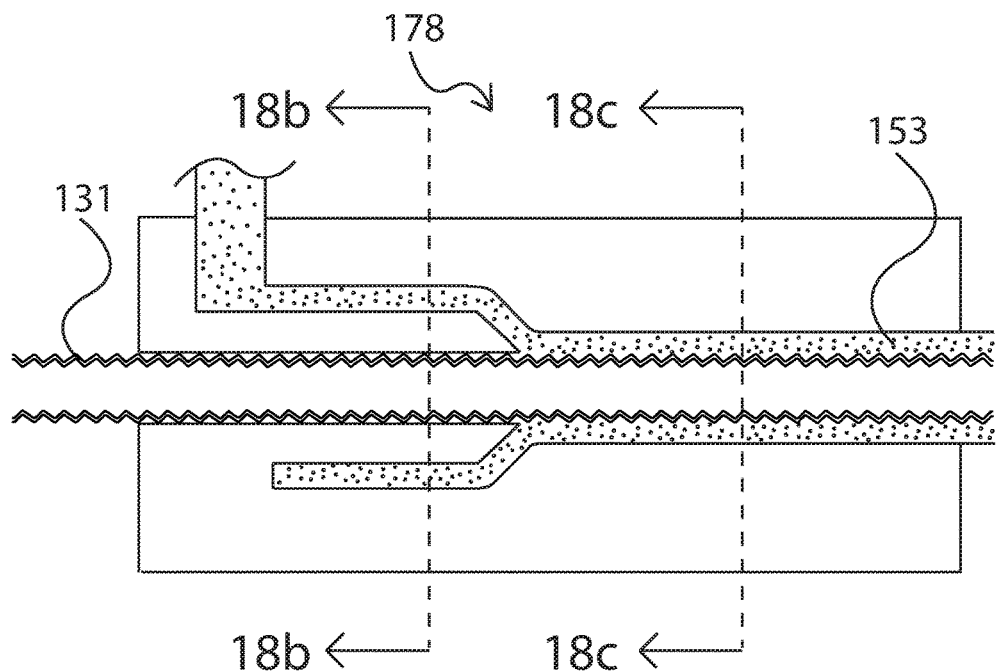
FIG. 18a is a sectional schematic diagram of a co-extrusion head that may be used to process the elastic tubular wall on the interior or exterior of segmented tubular wall of FIGS. 2a-4d.
Figures 18B, 18C:
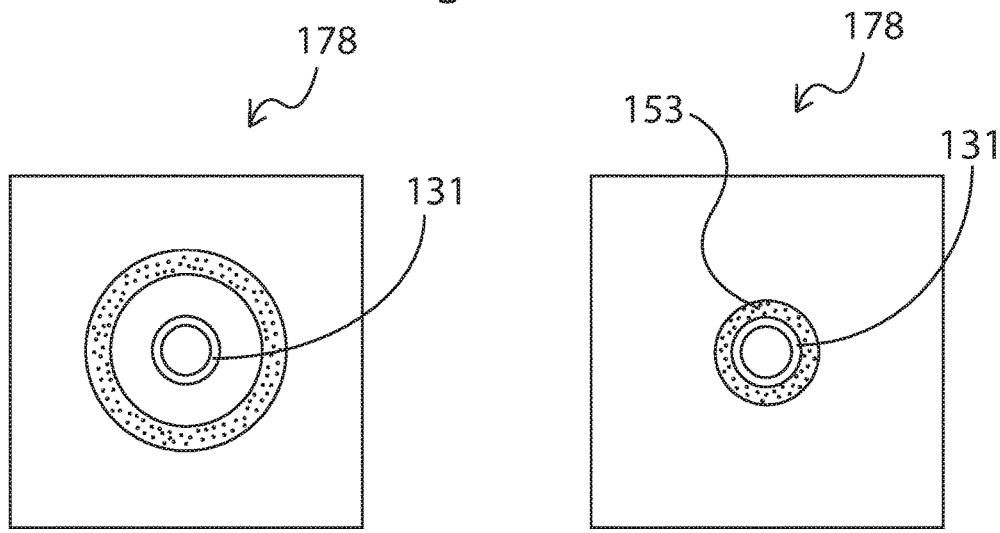
FIG. 18b is sectional view of the co-extrusion head of FIG. 18a along line 18b-18b.
FIG. 18c is a sectional view of the co-extrusion head of FIG. 18b along line 18c-18c.

Hose 120 may be fabricated using corrugated extrusion techniques as shown in FIG. 16. In this embodiment segmented tubular wall 131 (a.k.a. corrugated hose structure) is formed by having two tracks 172 holding mold blocks 174 (FIG. 17) rotate along the length of the extruder 176. Heated extrusion material is fed at the feed end and pressurized from within by air. The extrusion material is expanded and forced against the inner sides of mold blocks 174. The material cools as it moves along the length of extruder 176 and exits having corrugated hose structure 170 having segmented tubular wall 131.

Figure 20A:
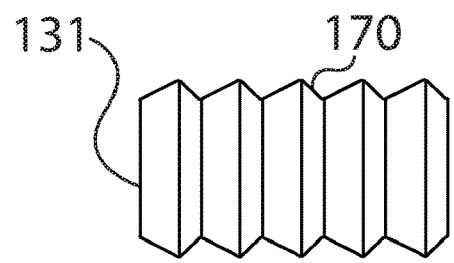
FIG. 20a is a side view showing a first step involved for adding an intrinsic bias during an embodiment of fabricating the segmented tubular wall in FIGS. 1a-4d and 13a-13b.
Figure 20B:
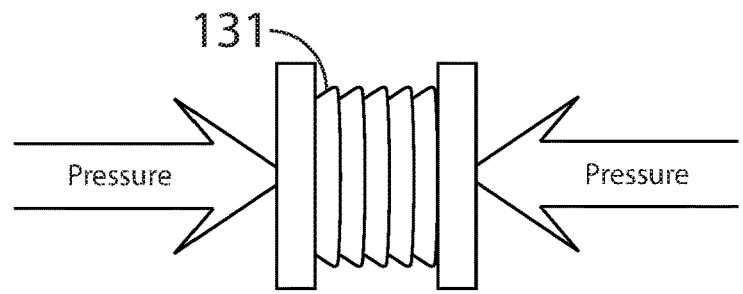
FIG. 20b is a side view showing a second step involved for adding an intrinsic bias during an embodiment of fabricating the segmented tubular wall in FIGS. 1a-4d and 13a-13b.
Figure 20C:
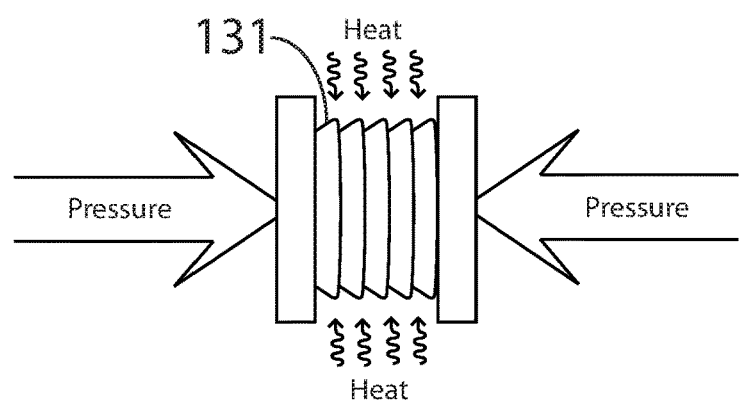
FIG. 20c is a side view showing a third step involved for adding an intrinsic bias during an embodiment of fabricating the segmented tubular wall in FIGS. 1a-4d and 13a-13b.
Figure 20D:
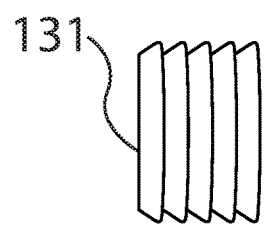
FIG. 20d is a side view showing a fourth step involved for adding an intrinsic bias during an embodiment of fabricating the segmented tubular wall in FIGS. 1a-4d and 13a-13b.

To produce a hose 130 with an intrinsic material memory force built into segmented tubular wall 131, additional processing is performed once the segmented tubular wall has been created. The as extruded segmented tubular wall 131, FIG. 20a, is first collapsed by applying pressure to the corrugated hose structure, FIG. 20b. The compressed structure in the contracted state is then annealed, under temperature and pressure, for the molecules to gain a memory position within the collapsed structure, FIG. 20c. Once cooled, the molecules making up segmented tubular wall 131 now remember their position so that after any extension, the hose will return to the collapsed state whenever any extension forces are removed, FIG. 20d. This process produces an intrinsic bias in segmented tubular wall 131. Segmented tubular wall 131 may be fabricated from a wide variety of raw corrugating materials (thermosets and thermoplastics, i.e. polymers) that have properties of being flexible or semi-rigid. Some of these materials are listed in FIG. 19a along with exemplary thermal processing needed to produce the material shape memory force with the shape memory polymer. Alternatively, shorter anneal times of only minutes may be achieved by dipping the heated materials into water or putting them through a high-speed cooler. Depending on the material, anneal temperatures may also be broader than those listed in FIG. 19a and in a range of 50° C. to 450° C.

In the embodiment where an internal bias element 152, such as an internal elastic tube is used to form hose 130b, segmented tubular wall 131 is cut to a selected length, then the elastic tube is threaded through the segmented tubular wall and couplers (160, 162) added to both ends.

In the embodiment where an external bias element 153 such as an external elastic tube or external elastic layer is used to form hose 30c, co-extrusion may be used. Co-extrusion uses a co-extruder 178 where the elastic bias is created in a separate step by fabricating an elastic tube or layer around segmented tubular wall 131. The compressed segmented tubular wall 131 is fed into the co-extruder head and the elastic material is extruded around the segmented tubular wall, FIGS. 18a-c. The elastic material may make a uniform layer around segmented tubular wall 131. The elastic layer becomes external bias element 153. The elastic layer may conform during expansion or create air gaps between the elastic layer and the segmented tubular wall 131. Elastic materials and processing temperatures are listed in FIG. 19b. In other embodiment, elastic layer may be created by a spray or dip process.

In general a double wall hose 130 with a segmented tubular wall 131 and either an internal biasing layer or and external biasing layer will be stronger and can withstand more pressure from within. External biasing layers can also smooth ridges in the segmented tubular wall and make the hose more abrasion resistant.

Figure 21:
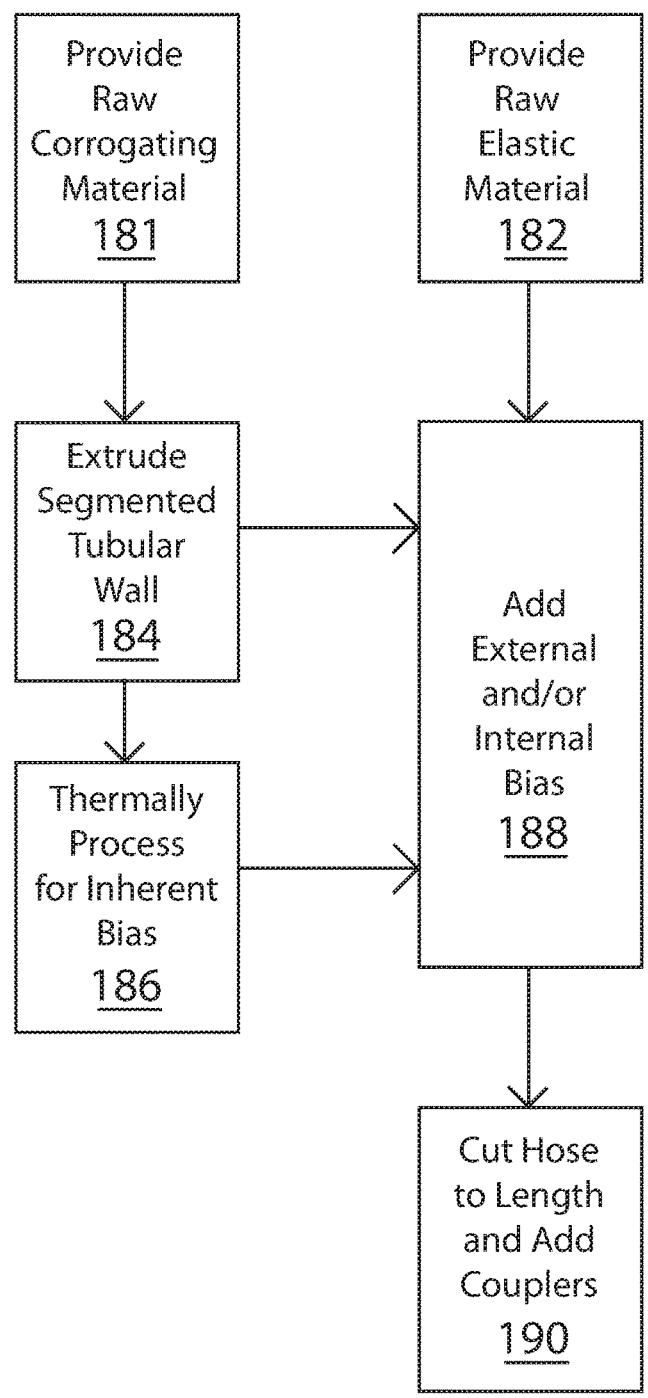
FIG. 21 is a process flow chart illustrating the general process flow for making the hose structures shown in FIGS. 1a-4d and 13a-13b.

FIG. 21 illustrates a general process flow for fabricating hoses 130a-130e. The process starts with providing raw corrugating materials 181 and raw elastic materials 182. The raw corrugating material 181 is then processed by extrusion 84 into segmented tubular wall 131. If an intrinsic bias is required, the segmented tubular wall is processed thermally 186 to induce an intrinsic bias. Internal bias element 152 and external bias element 153 are then added by internal and external bias introduction 188 as desired. The resulting structure is then processed by step 190 to form a hose 130 by cutting the structure to length and adding couplers (160,162).

Figure 22A:
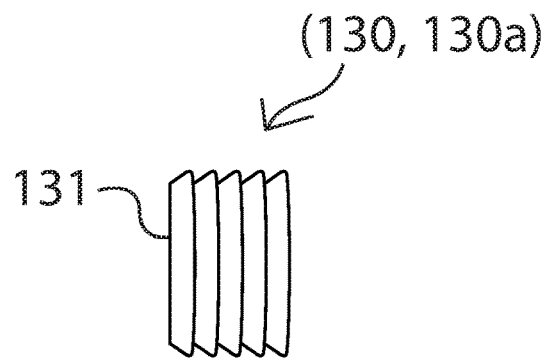
FIG. 22a is a side view illustrating the contracted state of the hose shown in FIGS. 1a-1d.
Figure 22B:
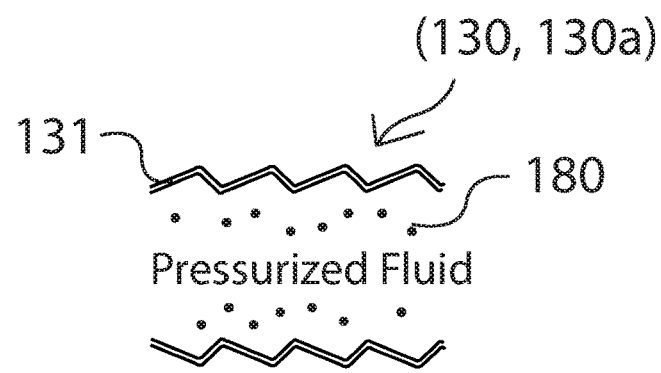
Figure 22C:
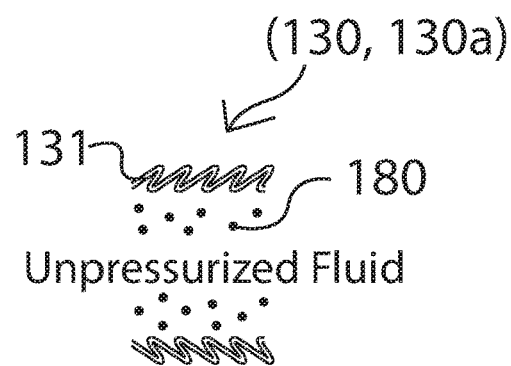

FIGS. 22a-22c illustrate how fluid pressure from within interior 132 of segmented tubular wall 131 of hose 130a actuates the expansion and contraction of the hose having a built-in bias (i.e. material memory force). With no fluid within hose 130a, the hose remains in a fully collapsed state, FIG. 22a. When a pressurized fluid 180 fills interior 132, contiguous segments 135 expand, FIG. 22b. Pressurized fluid 180 may be any fluid, examples being water or compressed air. When pressurized fluid 180 is turned off, some residual fluid remains within interior 132, but having no pressure to support the walls in an expanded state the memory forces collapse hose 130a, FIG. 22c.

Figure 23A:
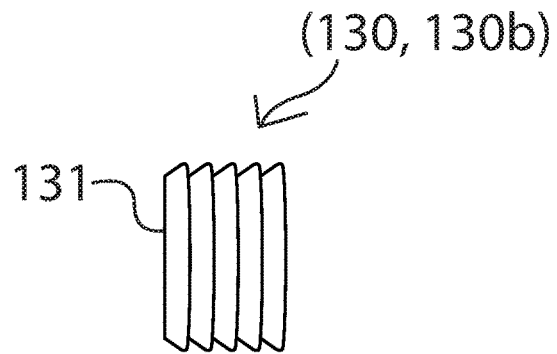
FIG. 23a is a side view illustrating the contracted state of the hose shown in FIGS. 2a-2d.
Figure 23B:
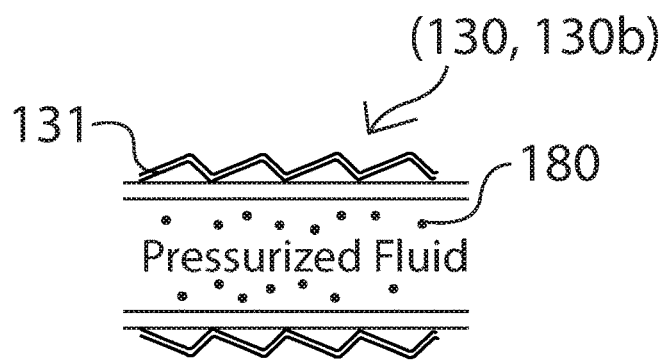
Figure 23C:
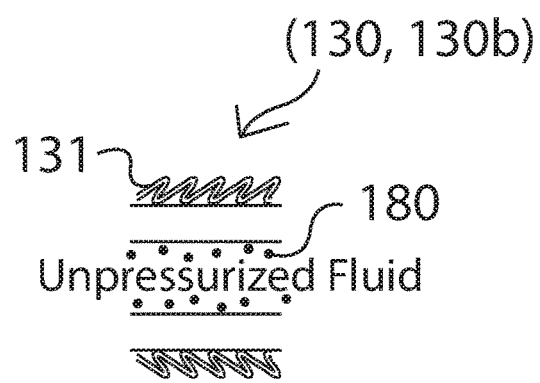

FIGS. 23a-23c illustrate how fluid pressure from within hose 130b influences the expansion and contraction of the hose having an internal bias element 152 as an elastic tube. With no fluid within hose 130b, the hose remains in a fully collapsed state, FIG. 23a. When a pressurized fluid 180 fills interior 182 of internal elastic tube, both internal elastic tube and contiguous segments 135 expand, FIG. 23b. Pressurized fluid 180 may be any fluid, examples being water or compressed air. When pressurized fluid 180 is turned off, some residual fluid remains within interior 132, but having no pressure to support the walls in an expanded state the bias forces collapse hose 130b, FIG. 23c.

Figure 24A:
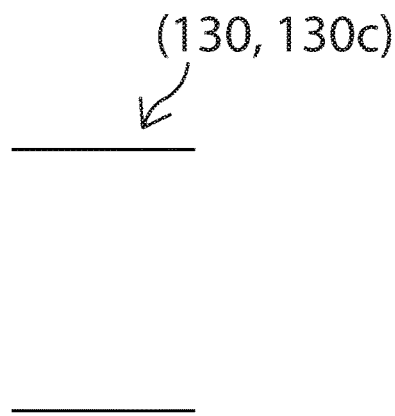
FIG. 24a is a side view illustrating the contracted state of the hose shown in FIGS. 3a-3d.
Figure 24B:
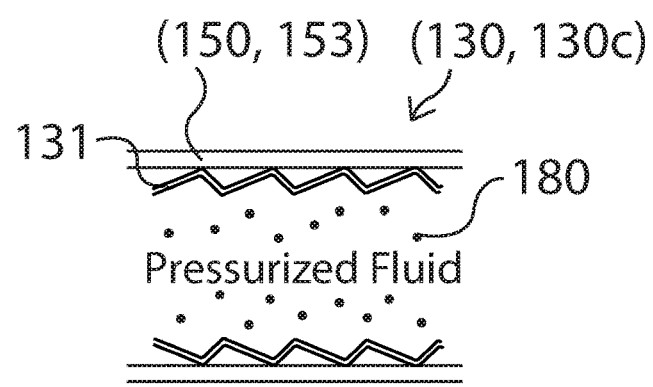
Figure 24C:
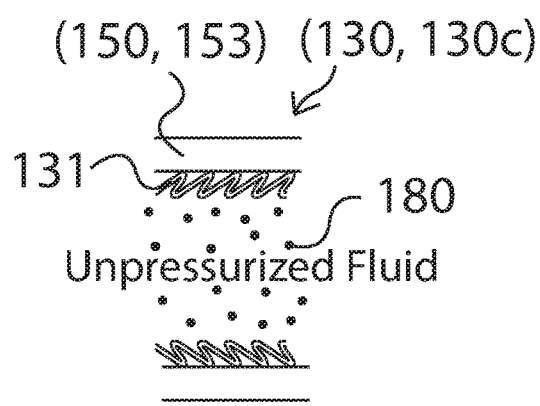
Figure 25A:
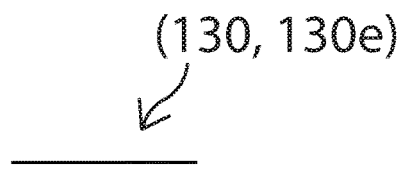
FIG. 25a is a side view illustrating the contracted state of the hose shown in FIGS. 4a-4d.
Figure 25B:
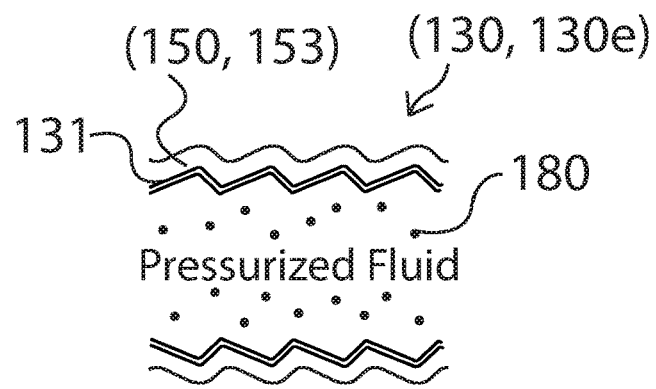
Figure 25C:
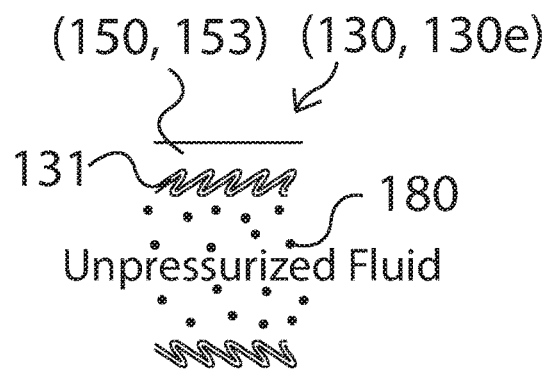
Figure 27A:
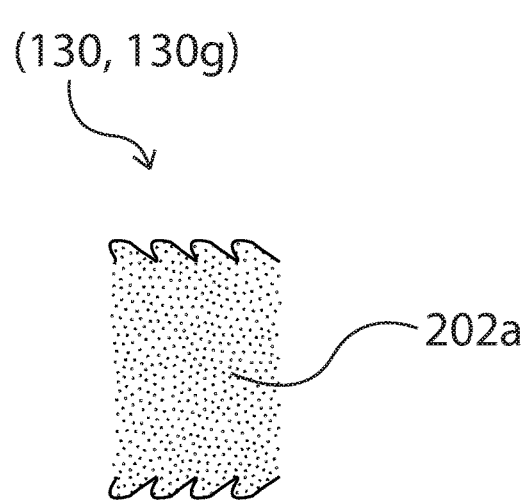
FIG. 27a is a side view of dashed section 27a of the hose in FIG. 26a showing an observed hose color for one embodiment of the color changing hose in a first state.
Figure 27B:
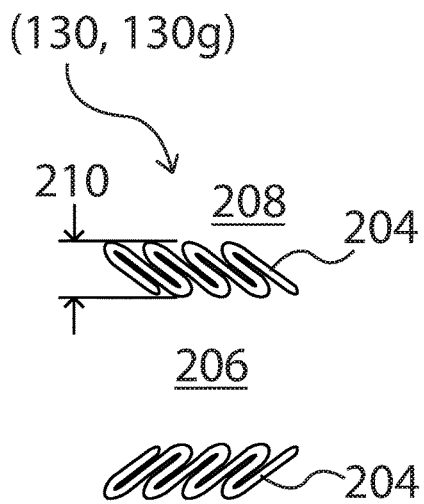
Figure 28A:
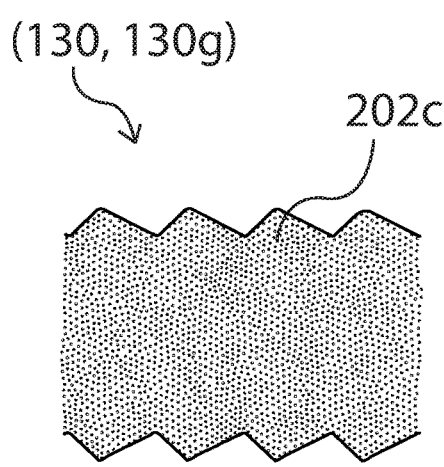
FIG. 28a is a side view of dashed section 28a of the hose in FIG. 26b showing an observed hose color for one embodiment of the color changing hose in a second state.
Figure 28B:
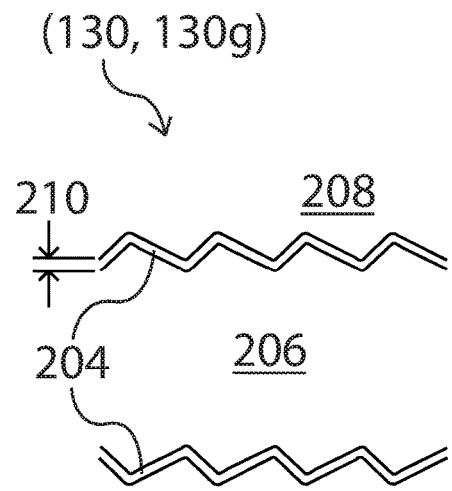
Figure 29A:
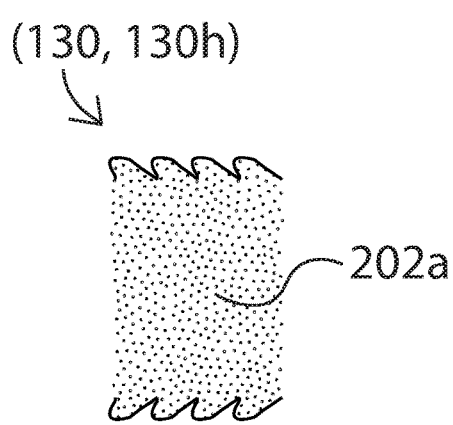
FIG. 29a is a side view of dashed section 29a of the hose in FIG. 26a showing an observed hose color for one embodiment of the color changing hose in a first state.
Figure 29B:
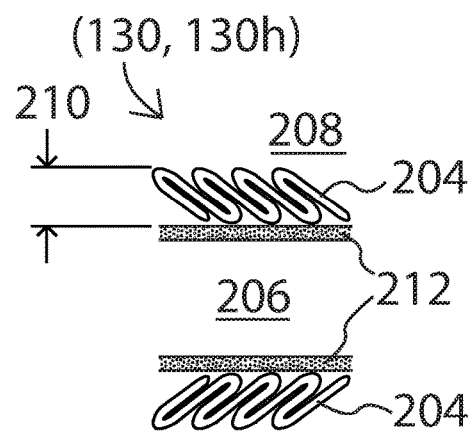
Figure 30A:
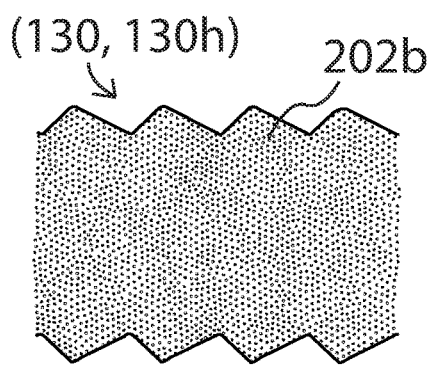
FIG. 30a is a side view of dashed section 30a of the hose in FIG. 26b showing an observed hose color for one embodiment of the color changing hose in an intermediate state.
Figure 30B:
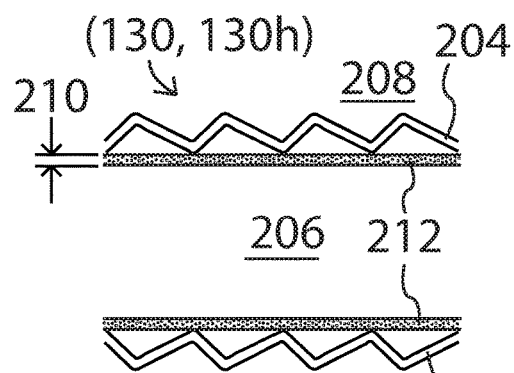
Figure 31A:
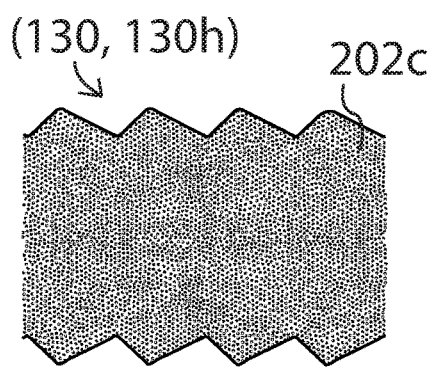
FIG. 31a is a side view of dashed section 31a of the hose in FIG. 26b showing an observed hose color for one embodiment of the color changing hose in a second state.
Figure 31B:
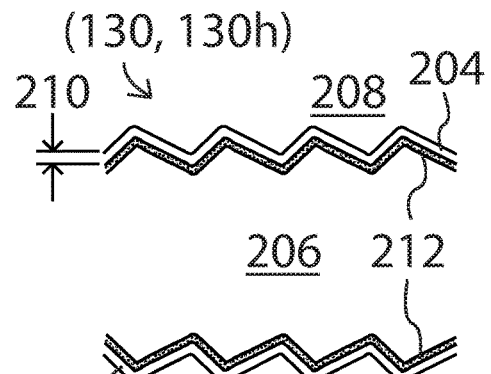
Figure 33A:
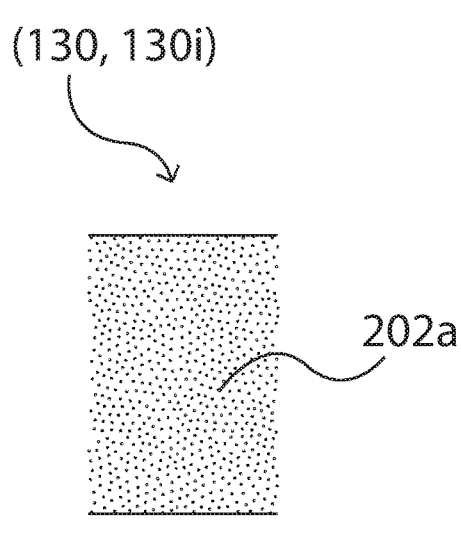
FIG. 33a is a side view of dashed section 33a for one embodiment of a hose having color changing properties in a first state.
Figure 33B:
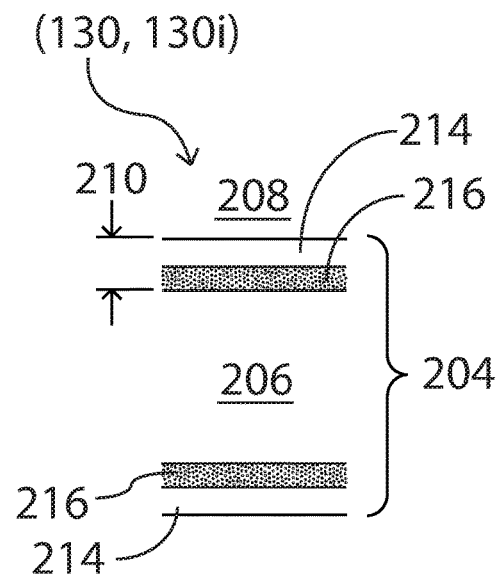
Figure 34A:
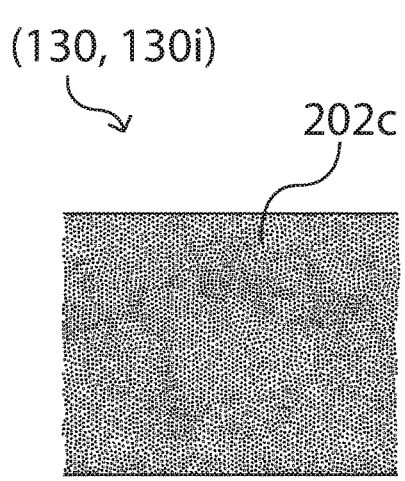
FIG. 34a is a side view of dashed section 34a for one embodiment of a hose having color changing properties in a second state.
Figure 34B:
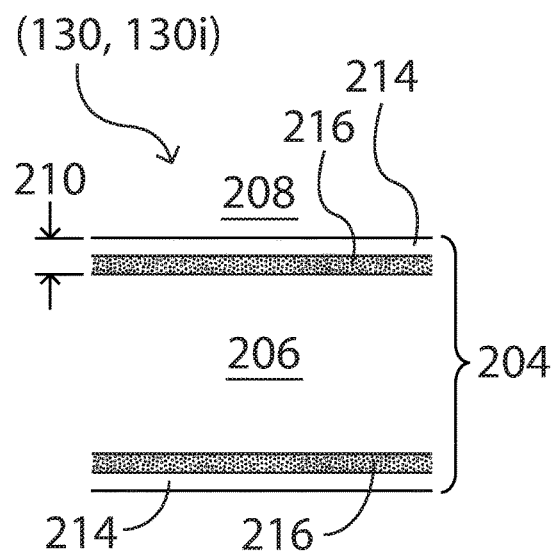
Figure 35A:
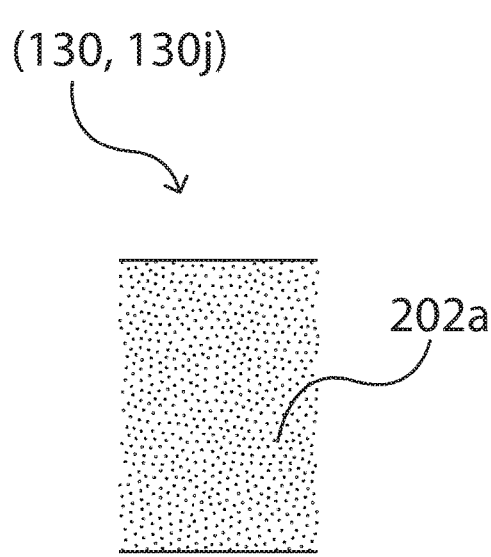
FIG. 35a is a side view of dashed section 35a of the hose in FIG. 32a showing an observed hose color for one embodiment of the color changing hose in a first state.
Figure 35B:
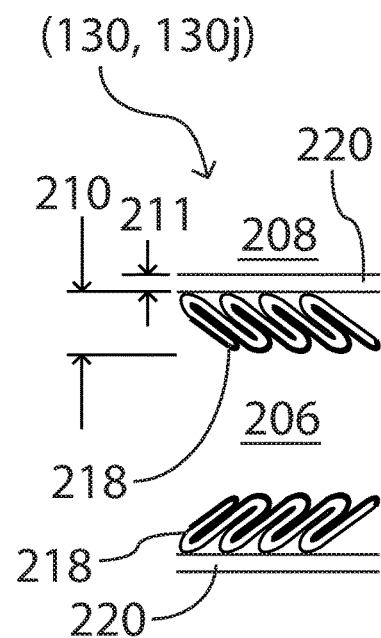
Figure 36A:
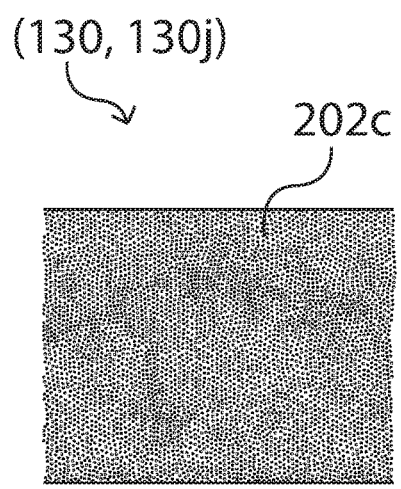
FIG. 36a is a side view of dashed section 36a of the hose in FIG. 32b showing an observed hose color for one embodiment of the color changing hose in a second state.
Figure 36B:
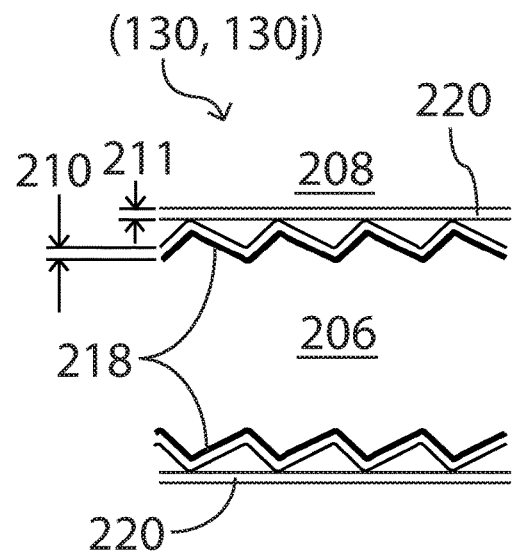
Figure 37A:
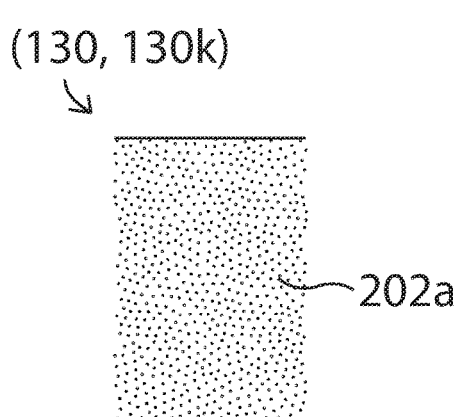
FIG. 37a is a side view of dashed section 37a of the hose in FIG. 32a showing an observed hose color for one embodiment of the color changing hose in a first state.
Figure 37B:
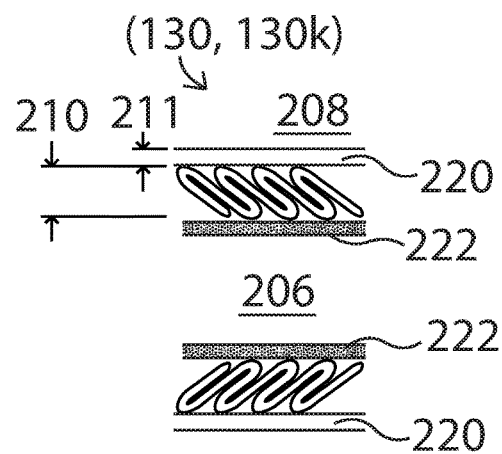
Figure 38A:
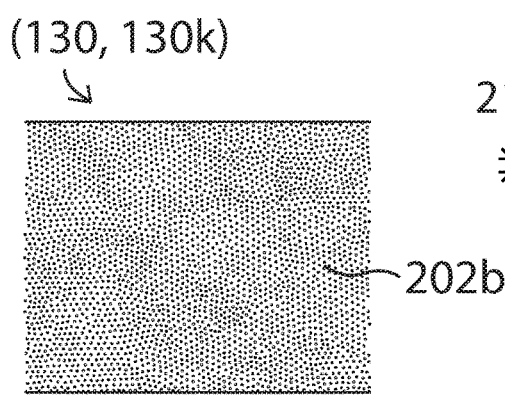
FIG. 38a is a side view of dashed section 38a of the hose in FIG. 32b showing an observed hose color for one embodiment of the color changing hose in an intermediate state.
Figure 38B:
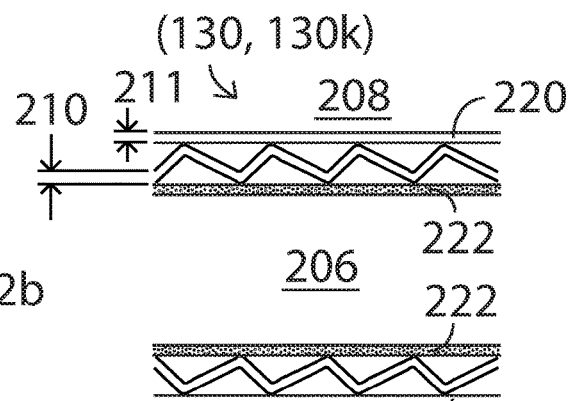
Figure 39A:
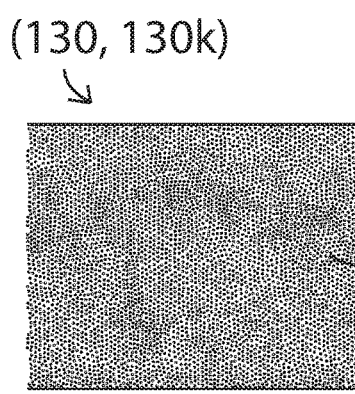
FIG. 39a is a side view of dashed section 39a of the hose in FIG. 32b showing an observed hose color for one embodiment of the color changing hose in a second state.
Figure 39B:
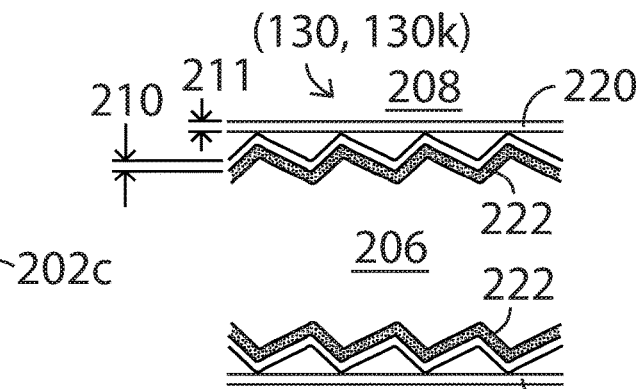
Figures 40A, 40B:
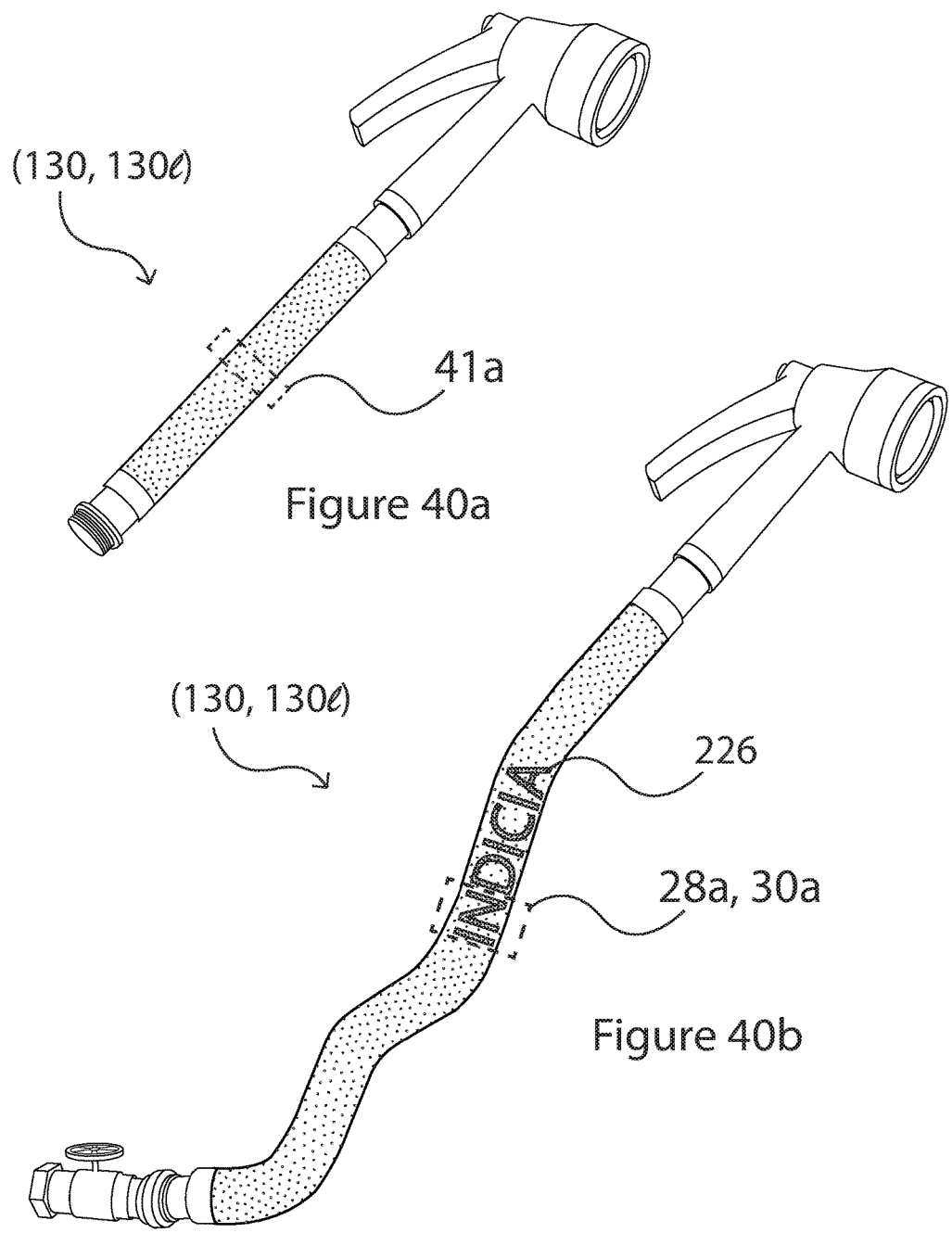
FIG. 40a is perspective view of one embodiment of a hose having color changing properties.
FIG. 40b is a perspective view of one embodiment of a hose having color changing properties that include the creation of indicia.
Figure 41A:
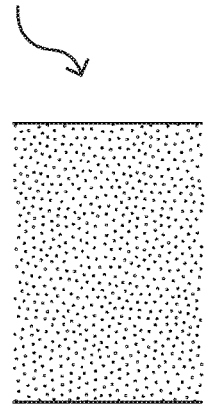
FIG. 41a is a side view of dashed section 41a of the hose in FIG. 40a showing an observed hose color for one embodiment of the color changing hose in a first state.
Figure 41B:
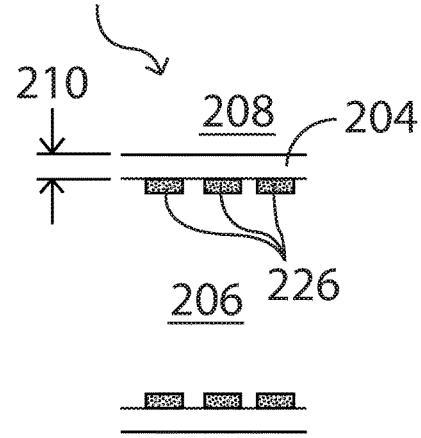
Figure 42A:
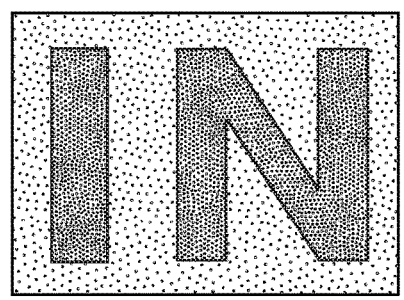
FIG. 42a is a side view of dashed section 42a of the hose in FIG. 40b showing generation of indicia for one embodiment of the color changing hose in a second state.
Figure 42B:
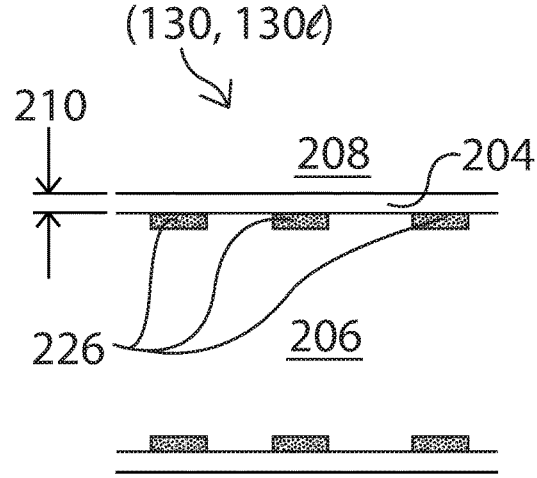

FIGS. 24a-24c illustrate how fluid pressure from within hose 130c influences the expansion and contraction of the hose having an external bias element 153 as an elastic sleeve. With no fluid within hose 130c, the hose remains in a fully collapsed state, FIG. 24a. When a pressurized fluid 180 fills interior 132, contiguous segments 135 and elastic sleeve expand, FIG. 24b. Pressurized fluid 180 may be any fluid, examples being water or compressed air. When pressurized fluid 180 is turned off, some residual fluid remains within interior 132, but having no pressure to support the walls in an expanded state the bias forces collapse hose 130c, FIG. 24c.

FIGS. 24a-24c illustrate how fluid pressure from within hose 130e influences the expansion and contraction of the hose having an external bias element 153 as a bonded elastic layer. With no fluid within hose 130e, the hose remains in a fully collapsed state, FIG. 25a. When a pressurized fluid 180 fills interior 132, contiguous segments 135 and bonded elastic layer expand, FIG. 25b. Pressurized fluid 180 may be any fluid, examples being water or compressed air. When pressurized fluid 180 is turned off, some residual fluid remains within interior 132, but having no pressure to support the walls in an expanded state the bias forces collapse hose 130e, FIG. 25c.

The color of hose 130 can have a purpose, such as the hose having a bright color different than the green color of grass in order for the hose to stand out and not get damaged by a lawn mower; or one may want the hose to be more visible when in use to reduce tripping hazards; or one may even want to alert the user that that water is on and may be still flowing/leaking from the hose and the hose should be shut off to conserve water. It may also be more esthetically pleasing to have the hose be more discrete (i.e., green, black, grey or white) when not in use such as at the spigot of a house or boat. The color of the hose may also take on a fanciful nature and just be intriguing or pleasing to the eye. Similarly having a hose that changes colors or patterns in various states of the hose, say when expanded and contracted or when filled with different amounts of water, can have similar utility and fanciful applications. Hose 130 (embodiments 130g-130n) may take on these color changing properties as shown in FIGS. 26a-45b. Different densities of stippling are used in these figures to denote different colors.

One embodiment of hose 130g having an observed hose color 202 (202a, 202c) is shown in FIGS. 26a-28b. Hose 130 comprises a tubular wall 204 having an interior 206, an exterior 208, an effective thickness 210 and a length. The actual color of tubular wall 204 may be a translucent color. Tubular wall 204 has multiple folds in a first state producing a thicker effective thickness 210 for tubular wall 204, FIG. 27b. Hose 130 may have a segmented tubular wall 131 with any of the structures and attributes describe earlier. In a second expanded state, tubular wall 204 has a single thickness, FIG. 28b. Having a thick effective thickness 210 in the first state makes hose 130g appear opaque from exterior 208 with an observed hose first color 202a, FIG. 27a. In the second state hose 130g is translucent with an observed hose second color 202c, FIG. 28a. Differences between the first state and second state may be the result of different expansions of hose 130g, different pressure pressures within the hose, differences in amount of fluid within the hose and different tension states for the hose produced by different tensile forces. Observed hose color changes 202 between the first state and second state may be a color change, a color shade change, alternating rings of at least two different colors or shades of color along the length of the hose, a color pattern change or even the generation of indicia on the hose.

One embodiment of hose 130h having an observed hose color 202 (202a, 202b, 202c) is shown in FIGS. 26a, 26b and 29a-31b. Hose 130 comprises a tubular wall 204 having an interior 206, an exterior 208, an effective thickness 210 and a length. Hose 130 further includes an inner tubular wall 212 with an inner tubular wall color. The actual color of tubular wall 204 may be a translucent color. Tubular wall 204 has multiple folds in a first state producing a thicker effective thickness 210 for tubular wall 204, FIG. 29b. Hose 130 may have a segmented tubular wall 131 with any of the structures and attributes describe earlier. In a second expanded state, tubular wall 204 has a single thickness, FIG. 31b. Having a thick effective thickness 210 in the first state makes hose 130h appear opaque from exterior 208 with an observed hose first color 202a, FIG. 29a. In the second state hose 130h is translucent with an observed hose second color 202c, FIG. 31a. Hose 130 may also have an intermediate state where inner tubular wall has not been pressed against tubular wall 204 and give rise to an observed hose intermediate color 202b. Whether there is a fluid between tubular wall 204 and inner tubular wall 212 in a fluid gap or the two walls are in intimate contact can affect or match index of refraction difference and the observed hose color. Differences between the first state and second state may be the result of different expansions of hose 130h, different pressure pressures within the hose, differences in amount of fluid within the hose and different tensions states for the hose produced by different tensile forces. Observed hose color changes 202 between the first state and second state may be a color change, a color shade change, alternating rings of at least two different colors or shades of color along the length of the hose, a color pattern change or even the generation of indicia on the hose.

One embodiment of hose 130i having an observed color 202 (202a, 202c) is shown in FIGS. 32a-34b. Hose 130 comprises a tubular wall 204 having an interior 206, an exterior 208, an effective thickness 210 and a length. Tubular wall 204 may include one or more layers (inner layer 216 and outer layer 214, FIGS. 33b and 334b) that are intimately bonded together or be separately layers moving independently of each other. Outer layer 214 may be opaque in a first state when the effective thickness 210 is relatively thick and produce an observed hose first color 202a, FIG. 33a. Outer layer 214 may be translucent or clear in a second state when the effective thickness 210 is relatively thin and produce an observed hose second color 202c, FIG. 34a. Differences between the first state and second state may be the result of different expansions of hose 130i, different pressure pressures within the hose, differences in amount of fluid within the hose and different tensions states for the hose produced by different tensile forces. Observed color changes 202 between the first state and second state may be a color change, a color shade change, alternating rings of at least two different colors or shades of color along the length of the hose, a color pattern change or even the generation of indicia on the hose.

One embodiment of hose 130j having an observed hose color 202 (202a, 202c) is shown in FIGS. 32a, 32b and 35a-36b. Hose 130 comprises a tubular wall 204 having an interior 206, an exterior 208, an effective thickness 210 and a length. Tubular wall 204 has multiple folds in a first state producing a thicker effective thickness 210 for tubular wall 204, FIG. 35b. Hose 130 may have a segmented tubular wall 131 with any of the structures and attributes describe earlier. Tubular wall 204 may have an inherent color or the tubular wall may be translucent with an inner thin color layer 218. Outer tubular wall 220 surrounds tubular wall 204. Outer tubular wall 220 has an effective outer tubular wall thickness 211. The effective outer tubular wall thickness 211 is reduced when changing from a first state to a second state, FIG. 36b. The effective tubular wall thickness 210 is also reduced when changing from a first state to a second state. Either the thick effective outer tubular wall thickness 211 or the thick effective tubular wall thickness 210 may together or independently contribute to an observed hose first color 202a in the first state, FIG. 35a. As the effective thickness of outer tubular wall 220 or tubular wall 204 are reduced, these outer tubular walls may be come transparent or translucent revealing the inner color to create observed hose second color 202c, FIG. 36a. Differences between the first state and second state may be the result of different expansions of hose 130j, different pressure pressures within the hose, differences in amount of fluid within the hose and different tensions states for the hose produced by different tensile forces. Observed hose color changes 202 between the first state and second state may be a color change, a color shade change, alternating rings of at least two different colors or shades of color along the length of the hose, a color pattern change or even the generation of indicia on the hose.

One embodiment of hose 130k having an observed hose color 202 (202a, 202b, 202c) is shown in FIGS. 32a, 32b and 37a-39b. Hose 130 comprises a tubular wall 204 having an interior 206, an exterior 208, an effective thickness 210 and a length. Tubular wall 204 has multiple folds in a first state producing a thicker effective thickness 210 for tubular wall 204, FIG. 37b. Hose 130 may have a segmented tubular wall 131 with any of the structures and attributes describe earlier or be some other folded wall structure. Tubular wall 204 may have an inherent color or the tubular wall may be translucent. Outer tubular wall 220 surrounds tubular wall 204. Outer tubular wall 220 has an effective outer tubular wall thickness 211. Inner tubular wall 222 is within interior 206 of tubular wall 204. Inner tubular wall has an inner tubular wall color 224. The effective outer tubular wall thickness 211 is reduced when changing from a first state to a second state, FIG. 37b. The effective tubular wall thickness 210 is also reduced when changing from a first state to a second state. Either the thick effective outer tubular wall thickness 211 or the thick effective tubular wall thickness 210 may together or independently contribute to an observed hose first color 202a in the first state, FIG. 35a. As the effective thickness of outer tubular wall 220 or tubular wall 204 are reduced, these outer tubular walls may be come transparent or translucent revealing the inner color to create observed hose second color 202c, FIG. 39a. Hose 130 may also have an intermediate state where inner tubular wall has not been pressed against tubular wall 204 and give rise to an observed hose intermediate color 202b. Whether there is a fluid between tubular wall 204 and inner tubular wall 212 in a fluid gap or the two walls are in intimate contact can affect or match index of refraction difference and the observed hose color. Differences between the first state and second state may be the result of different expansions of hose 130k, different pressure pressures within the hose, differences in amount of fluid within the hose and different tensions states for the hose produced by different tensile forces. Observed hose color changes 202 between the first state and second state may be a color change, a color shade change, alternating rings of at least two different colors or shades of color along the length of the hose, a color pattern change or even the generation of indicia on the hose.

One embodiment of hose 130e having an observed color 202 (202a, 202c) is shown in FIGS. 40a-42b. Hose 130 comprises a tubular wall 204 having an interior 206, an exterior 208, an effective thickness 210 and a length. Tubular wall 204 has an indicia 226 printed on the interior 206 of the wall, 41b. Tubular wall 204 is opaque in a first state when the effective thickness 210 is relatively thick and produce an observed hose first color 202a, FIG. 41a. Tubular wall 204 becomes clear or translucent in a second state when the effective thickness 210 is relatively thin and produces reveals the indicia 226, FIGS. 40b and 42a. It is understood that other hose structures (130h-130k) could also be adapted to have indicia 226 revealed as well, where the color of the layer is a layer in the pattern of an indicia. Differences between the first state and second state may be the result of different expansions of hose 130e, different pressure pressures within the hose, differences in amount of fluid within the hose and different tensions states for the hose produced by different tensile forces. Observed color changes 202 between the first state and second state may be a color change, a color shade change, alternating rings of at least two different colors or shades of color along the length of the hose, a color pattern change or even the generation of indicia on the hose.

Figure 43A:
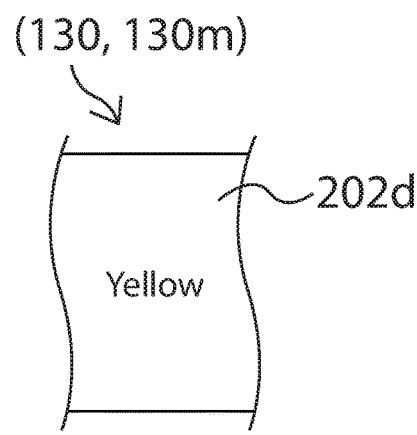
FIG. 43a is a schematic side view of hoses shown in FIG. 26a or 32a showing an observed hose color for one embodiment of the color changing hose in a first state.
Figure 43B:
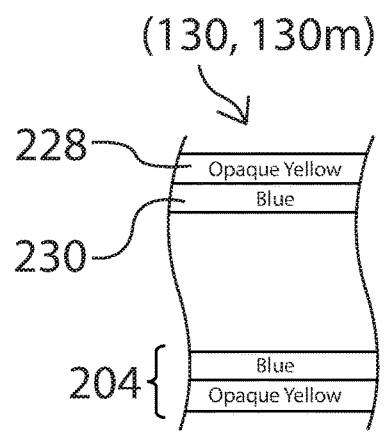
Figure 44A:
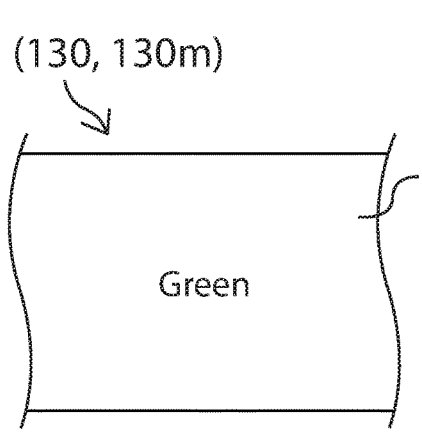
FIG. 44a is a schematic side view of hoses shown in FIG. 26b or 32b showing observed hose color for one embodiment of the color changing hose in a second state.
Figure 44B:
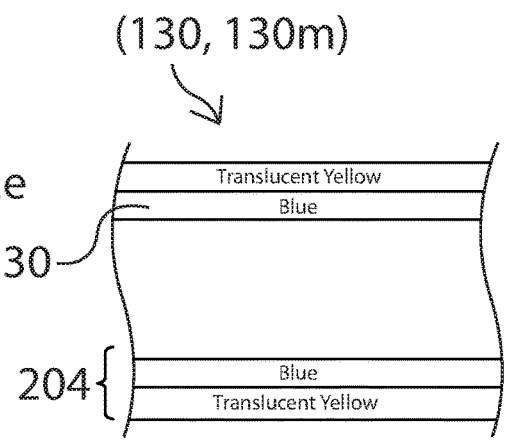

One embodiment of hose 130m having an observed color 202 (202d, 202e) is shown in FIGS. 43a-43b. Hose 130 comprises a tubular wall 204 having an interior 206, an exterior 208, an effective thickness 210 and a length. Tubular wall 204 comprises an outer tubular wall having an outer tubular wall color 228 and a tubular wall having an tubular wall color 230. In a first state, the effective outer tubular wall is thicker and opaque providing an observed hose first color. In a second state, the effective outer color tubular is thinner and translucent allowing inner color and outer color layer to combine to create a new observed hose color 202e.

Figure 45A:
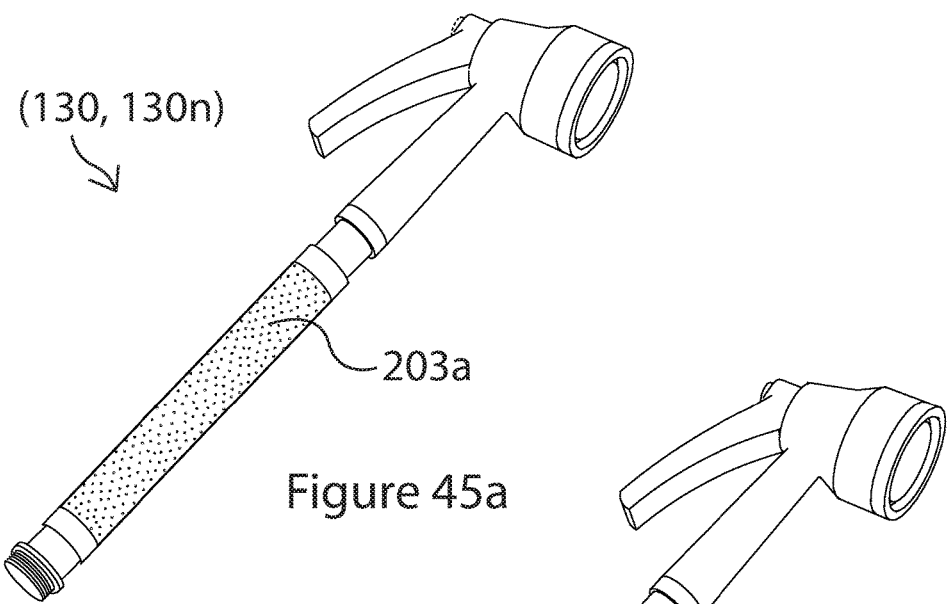
FIG. 45a is perspective view of one embodiment of a hose having color changing properties.
Figure 45B:
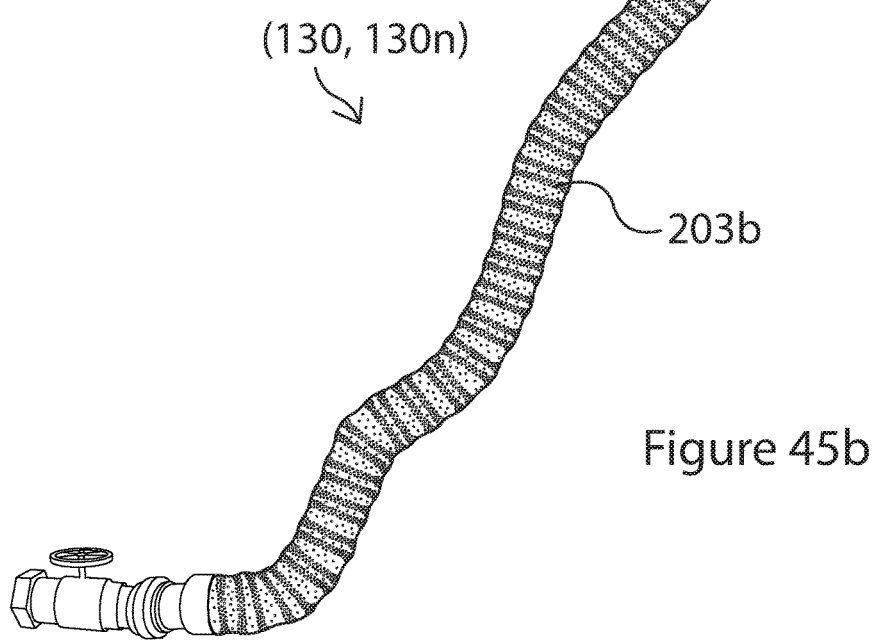
FIG. 45b is a perspective view of one embodiment of a hose having color changing properties that include the creation of a pattern change that can be stripes along the length of the hose.

One embodiment of hose 130n having an observed color pattern 203 (203a, 203b) is shown in FIGS. 45a-45b. Hose 130 comprises a tubular wall 204 having an interior 206, an exterior 208, an effective thickness 210 and a length. Tubular wall 204 is has a first color patter 203a (uniform color or pattern) in a first state and then has a second different pattern in a second state.

Although hose 130 is illustrated in FIGS. 1-31b and 35a-39b as having sections of a conical surface and more particularly frustum of a right cone; it should be should be understood that the multiple folds and segments do not have to be frustum of a right cone or even sections of a cone in some embodiments of the color changing hose. In some embodiments tubular wall 204 may have folds of any size, length or shape necessary to create folds. The first and second wall segments may, but do not have to extend from the same side of the transverse plane in a contracted state and extend from opposites sides of the transverse plane in an expanded state. Also, the angles of tubular wall 204 relative to transverse plane 127, in the contracted state and expanded state, may be any angle and not even the same angle between folds of each section.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. A hose having an observed hose color and length, comprising:
a tubular wall having an interior and an exterior; wherein said tubular wall is a segmented tubular wall; and wherein the observed hose color from the exterior changes between an observed hose first color in a first state and an observed hose second color in a second state.

2. A hose as recited in claim 1, wherein said first state is a first expansion state and said second state is a second expansion state.

3. A hose as recited in claim 1, wherein said first state is a first pressure state and said second state is a second pressure state.

4. A hose as recited in claim 3, wherein said first pressure state is generated by a first fluid pressure applied within said interior and said second pressure state is generated by a second fluid pressure applied within said interior.

5. A hose as recited in claim 1, wherein said first state is a first tension state and said second state is a second tension state.

6. A hose as recited in claim 5, wherein said first tension state is generated by a first tensile force on the hose and said second tensile state is generated by a second tensile force on the hose.

7. A hose as recited in claim 1, wherein said tubular wall changes from opaque in said first state to translucent or clear in said second state.

8. A hose as recited in claim 7, wherein said observed hose second color is said tubular wall color.

9. A hose as recited in claim 1, further comprising an outer tubular wall.

10. A hose as recited in claim 9, wherein said outer tubular wall has an effective outer tubular wall thickness, wherein said effective outer tubular wall thickness is reduced when changing from said first state to said second state.

11. A hose as recited in claim 9, wherein said outer tubular wall changes from opaque in said first state to translucent or clear in said second state.

12. A hose as recited in claim 9, wherein said tubular wall has a tubular wall color and said outer tubular wall has an outer tubular wall color, wherein said tubular wall color and said outer tubular wall color combine to create a new observed hose color different from said tubular wall color and said outer tubular wall color.

13. A hose as recited in claim 1, further comprising an inner tubular wall.

14. A hose as recited in claim 13, wherein said inner tubular wall has an inner tubular wall color.

15. A hose as recited in claim 14, wherein said observed hose second color is said inner tubular wall color.

16. A hose as recited in claim 13, wherein a fluid gap exists between said tubular wall and said inner tubular wall, wherein said fluid gap decreases to enhance observed hose color between said first state and said second state.

17. A hose as recited in claim 13, wherein a fluid gap exists between said tubular wall and said inner tubular wall, wherein a fluid exists in said fluid gap, wherein said fluid matches index of refraction between said tubular wall and said inner tubular wall to improve transmission of said inner tubular wall color.

18. A hose as recited in claim 13, wherein said tubular wall has a tubular wall color and said inner tubular wall has an inner tubular wall color, wherein said tubular wall color and said inner tubular wall color combine to create a new observed hose color.

19. A hose as recited in claim 1, wherein said observed hose color change is a color shade change.

20. A hose as recited in claim 1, wherein said observed first hose color is a pattern, wherein said observed hose second color is a pattern different than said observed hose first color pattern.

21. A hose as recited in claim 1, wherein said observed hose second color in said second state is the generation of indicia on the hose.

22. A hose as recited in claim 1, wherein said observed hose second color in said second state is the generation of alternating rings of at least two different colors along the length of the hose.

23. A hose having an observed hose color and length, comprising:
   a tubular wall having an interior and an exterior; wherein said tubular wall has an effective tubular wall thickness; wherein said effective tubular wall thickness is reduced when changing from a first state to a second state; and wherein the observed hose color from the exterior changes between an observed hose first color in said first state and an observed hose second color in said second state.

24. A hose having an observed hose color and length, comprising:
   a tubular wall having an interior, an exterior and an interior surface; wherein said interior surface includes a thin color layer; and wherein the observed hose color from the exterior changes between an observed hose first color in a first state and an observed hose second color in a second state.

25. A hose having an observed hose color and length, comprising:
   a tubular wall having an interior and an exterior; wherein the observed hose color from the exterior changes between an observed hose first color in a first state and an observed hose second color in a second state; and wherein said observed hose second color in said second state is alternating rings of at least two different colors along the length of the hose.

\* \* \* \* \*